US006584045B1

United States Patent
Ishii et al.

(10) Patent No.: US 6,584,045 B1
(45) Date of Patent: Jun. 24, 2003

(54) HIGH SPEED MAGNETIC COIL FOR MAGNETO-OPTICAL HEAD

(75) Inventors: Kazuyoshi Ishii, Tokyo (JP); Kozo Yoshida, Shizuoka (JP)

(73) Assignees: Canon Kabushiki Kaisha, Tokyo (JP); Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/674,432

(22) PCT Filed: Apr. 30, 1999

(86) PCT No.: PCT/JP99/02318

§ 371 (c)(1),
(2), (4) Date: Nov. 1, 2000

(87) PCT Pub. No.: WO99/57718

PCT Pub. Date: Nov. 11, 1999

(30) Foreign Application Priority Data

May 7, 1998 (JP) .......................................... 10-124736
Sep. 10, 1998 (JP) .......................................... 10-257156
Apr. 15, 1999 (JP) .......................................... 11-108337

(51) Int. Cl.[7] ................................................ G11B 11/00
(52) U.S. Cl. ................................. 369/13.23; 369/13.17
(58) Field of Search ........................... 369/13.23, 13.22, 369/13.17, 13.18, 13.19, 13.2, 13.21

(56) References Cited

U.S. PATENT DOCUMENTS

| | | | |
|---|---|---|---|
| 5,293,360 A | 3/1994 | Hasegawa et al. ............ 369/13 |
| 5,377,055 A | 12/1994 | Ishii ............................ 360/59 |
| 5,485,433 A | 1/1996 | Satomura et al. ............. 369/13 |
| 5,523,986 A | 6/1996 | Ishii ............................ 369/13 |
| 5,550,796 A | 8/1996 | Ishii ............................ 369/13 |
| 5,559,763 A | 9/1996 | Ishii ............................ 369/13 |
| 5,563,853 A | 10/1996 | Ishii ............................ 369/13 |
| 5,579,293 A | 11/1996 | Ishii ............................ 369/13 |
| 5,586,091 A | 12/1996 | Ishii et al. .................... 369/13 |
| 5,615,183 A | 3/1997 | Ishii ............................ 369/13 |
| 5,661,612 A | 8/1997 | Hasegawa et al. ............ 360/59 |
| 5,687,141 A | 11/1997 | Ishii ............................ 369/13 |
| 5,689,478 A | 11/1997 | Ishii et al. .................... 369/13 |
| 5,703,839 A | 12/1997 | Ishii ............................ 369/13 |
| 5,986,976 A | 11/1999 | Ishii ............................ 369/13 |
| 5,991,242 A | 11/1999 | Ishii ............................ 369/13 |
| 6,041,024 A | 3/2000 | Ishii ............................ 369/13 |
| 6,314,060 B1 * | 11/2001 | Ishii ........................ 369/13.23 |

FOREIGN PATENT DOCUMENTS

| | | |
|---|---|---|
| JP | 63-48603 | 3/1988 |
| JP | 2-235203 | 9/1990 |
| JP | 3-84705 | 4/1991 |
| JP | 4-10202 | 1/1992 |
| JP | 4-74335 | 3/1992 |
| JP | 6-84225 | 3/1994 |
| JP | 6-309610 | 11/1994 |
| JP | 8-63824 | 3/1996 |
| JP | 10-255206 | 9/1998 |
| JP | 10-255207 | 9/1998 |

* cited by examiner

*Primary Examiner*—Tan Dinh
(74) *Attorney, Agent, or Firm*—Fitzpatrick, Cella, Harper & Scinto

(57) ABSTRACT

The conductor pattern of a magnetic head coil includes a spiral coil pattern to which a current can be supplied to flow around the magnetic field generation center, and a conductor pattern which is formed outside the coil pattern and cannot receive a current so as to flow around the magnetic field generation center. Letting S be the distance from the outer edge of the outermost periphery of the coil pattern, and P be the pitch, a conductor occupation ratio R of a conductor pattern formed outside the coil pattern simultaneously satisfies inequalities 1 to 3, and the conductor pattern does not form any closed loop surrounding the coil pattern in a first region A1 given by inequality 1:
Inequality 1: $0 \leq R \leq 0.3$ in the first region A1 where
$0 \leq S \leq 1.5P$
Inequality 2: $0 \leq R \leq 0.8$ in a second region A2 where
$1.5P < S \leq 6.0P$
Inequality 3: $0.3 < R \leq 1$ in a third region A3 where
$6.0P < S$

24 Claims, 18 Drawing Sheets

HIGH SPEED MAGNETIC COIL FOR MAGNETO-OPTICAL HEAD

TECHNICAL FIELD

The present invention relates to a magnetic head coil suitable for recording an information signal at a high speed, a magnetic head using it, and a magneto-optical recording apparatus.

BACKGROUND ART

A conventionally known magneto-optical recording apparatus applies a magnetic field modulated by an information signal to a magneto-optical recording medium such as a magneto-optical disk, and irradiates the medium with light to record an information signal. This magneto-optical recording apparatus comprises a magnetic head for applying a magnetic field. The magnetic head may be one of various types of heads. For example, FIG. 17 is a perspective view showing a magnetic head disclosed in Japanese Laid-Open Patent Application No. 4-74335, and FIG. 18 is a sectional view showing the magnetic head.

Reference numeral 50 denotes a flat coil component (to be referred to as a coil hereinafter) formed from a flexible printed wiring board; and 51, a core made of a magnetic material such as ferrite. The coil 50 is constituted by a flexible base 52 made of polyimide or polyester, a spiral coil pattern 53 serving as a conductor pattern made of a copper foil formed on the base 52, and terminals 54a and 54b. The coil 50 is bonded to the core 51 with an adhesive 55.

The terminals 54a and 54b of the coil 50 are connected to the magnetic head drive circuit of a magneto-optical recording apparatus. The magneto-optical recording apparatus comprises an optical head. To record an information signal, the optical head irradiates the magnetic recording layer of a magneto-optical recording medium with a laser beam so as to converge the laser beam to a small light spot. At the same time, the magnetic head drive circuit supplies a current to the coil pattern 53 to generate a magnetic field modulated by an information signal from the center of the coil pattern 53, and vertically applies the magnetic field to the laser beam irradiation position of the magnetic recording layer.

Conventionally, like this prior art, only a conductor pattern serving as a path for positively supplying a current, i.e., a conductor pattern necessary for an electrical function is formed on components using conductor patterns including a flat coil component for a magnetic head.

In recent years, as demands have arisen for a higher information signal recording speed, the flat coil component used in the magnetic head must be downsized. Along with this, the dimensional precision and flatness of the flat coil component must be increased to adjust the relative position to the optical head and the distance from the magneto-optical recording medium at higher precision. The magnetic field must be accurately, efficiently applied to the light spot position on the magnetic recording layer of the magneto-optical recording medium. However, the above-described flat coil is low in rigidity and mechanical strength, readily deforms in manufacturing a magnetic head, and is difficult to be adjusted to an accurate position. Thus, the above demands cannot be met. This problem will be explained in detail.

To more efficiently generate a magnetic field in the above magnetic head, the coil pattern 53 must be formed very close to the core 51. For this purpose, the base 52 must be as thin as possible. To efficiently apply a magnetic field to the magneto-optical recording medium, the surface of the coil 50 must be brought very close to the magneto-optical recording medium.

Although not described in the above reference, the base 52 constituting the coil 50 is made of a 20-$\mu$m thick polyimide sheet. Since the thin resin material sheet is very flexible, the coil 50 is insufficient in rigidity, posing the following problem in manufacturing a magnetic head.

More specifically, in bonding the coil 50 and the core 51, the coil 50 cannot resist an operating force and readily deforms, e.g., bends at a portion where no coil pattern 53 is formed. As a result, the attaching position of the coil 50 is not accurately determined, causing an error. The relative position to the optical head deviates, so an information signal cannot be normally recorded.

A conductor pattern for connecting the coil pattern to the terminal 54b is formed to protrude from the base 52 on a surface of the coil 50 facing the core 51. Thus, the surface of the coil 50 facing the core 51 is not flat. In bonding the coil 50 to the core 51, part of a surface of the coil 50 facing the magneto-optical disk readily deforms, e.g., protrudes or inclines. This inhibits the surface of the coil 50 facing the magneto-optical recording medium from coming very close to the magneto-optical recording medium so as to efficiently apply a magnetic field.

To increase the information signal recording speed, the magnetic field modulation frequency must be increased. However, the RF loss on the core 51 and coil pattern 53 increases in almost proportion to the modulation frequency, so that the temperature of the magnetic head rises. The magnetic material such as ferrite forming the core 51 decreases in saturation flux density Bs along with the temperature rise. As the magnetic field modulation frequency increases, the saturation flux density Bs of ferrite forming the core 51 decreases to be equal to the internal flux density of the core 51. If the magnetic field modulation frequency further increases, the internal flux density of the core 51 decreases together with the saturation flux density Bs, and the strength of a magnetic field generated by the magnetic head also decreases. As a result, a magnetic field applied to the magneto-optical recording medium weakens, failing to record an information signal.

If the temperature of the magnetic head exceeds the heat resistance limit of its building member, deformation or electrical insulation failure may occur.

Under these circumstances, an increase in modulation frequency is limited, and the information signal recording speed cannot be further increased.

DISCLOSURE OF INVENTION

In the present invention, a flat coil (to be referred to as a coil hereinafter) for a magnetic head is made up of at least a coil pattern serving as a conductor pattern made of a conductive material film, and a terminal for supplying a current to the coil pattern. The coil pattern is a spiral conductor pattern capable of supplying a current so as to flow around the magnetic field generation center. In the present invention, a region where this coil pattern is formed is defined as an "effective region" where an effective current contributing to generation of a magnetic field can be supplied. A region outside the coil pattern where at least the conductor pattern capable of supplying a current so as to flow around the magnetic field generation center is not formed is defined as an "ineffective region". In the following description, conductor patterns formed in the ineffective region except for a conductor pattern serving as a current supply path to the coil pattern, such as a conductor pattern for connecting terminals to each other and a terminal to the coil pattern, will be referred to as a "dummy pattern".

The present invention has been made to overcome the conventional drawbacks, and has as its object to provide a flat coil for a magnetic head in which a conductor pattern is formed in the ineffective region, and a conductor occupation ratio R (ratio of the total area of all conductor patterns formed from a conductive material film in a given region, to the total area of the region) is defined within a predetermined range in accordance with the distance from the coil pattern, thereby improving the mechanical strength, flatness, and dimensional precision without degrading the electrical characteristics of the coil, a magnetic head using the flat coil, and a magneto-optical recording apparatus.

The present inventors have made extensive studies to find that the above problem can be solved when, letting S be the distance from the outer edge of the coil pattern (outer edge of the effective region), P be the pitch (or minimum value when the pitch is not constant) of the coil pattern, and R be the conductor occupation ratio, the ineffective region outside the effective region is divided into a plurality of regions on the basis of the distance S, conductor patterns are laid out in the respective regions so as to simultaneously satisfy inequalities 1, 2, and 3, and the conductor pattern in a first region A1 does not form any closed loop:

Inequality 1: $0 \leq R \leq 0.3$ in the first region A1 where
$0 \leq S \leq 1.5P$ Inequality 2: $0 \leq R \leq 0.8$ in a second region A2 where
$1.5P < S \leq 6.0P$ Inequality 3: $0.3 < R \leq 1$ in a third region A3 where
$6.0P < S$ More specifically, the conductor occupation ratio R of a conductor pattern formed in the ineffective region is set low near the coil pattern, and set high apart from the coil pattern. In this case, the electrical characteristics and mechanical strength of the coil can be consistent with each other. If necessary, a dummy pattern not serving as a current supply path to the coil pattern is formed in the ineffective region such that the conductor occupation ratio R of the conductor pattern in the ineffective region simultaneously satisfies inequalities 1, 2, and 3. This will be explained in more detail.

If the area of a conductor pattern formed in the first region A1 of the ineffective region that is nearest to the coil pattern is large, a large electrostatic capacitance is generated between the coil pattern and the conductor pattern formed in the first region A1. Such large electrostatic capacitance decreases the change rate of a current supplied to the coil to decrease the magnetic field inversion speed in generating a magnetic field modulated by the magnetic head. As a result, an information signal becomes difficult to record at a high speed. In the manufacture of a coil or after long-term use, the insulation reliability between the conductor pattern formed in the first region A1 and the coil pattern degrades. To prevent this, no conductor pattern is formed or the conductor occupation ratio R of the conductor pattern is suppressed to 0.3 or less in the first region A1.

If the conductor pattern forms near the coil pattern a closed loop surrounding the coil pattern, a current (eddy current) reverse to the supply current to the coil pattern is induced in the conductor pattern in supplying a current to the coil pattern and generating a magnetic field modulated by the magnetic head. Consequently, the change of a magnetic field to be generated is canceled, failing in normal information signal recording. To prevent this, it is preferable that the conductor pattern in the first region A1 be discontinuously formed by dividing the conductor pattern into two or more in the spiral direction of the coil pattern, and all the divided conductor patterns have an interval of 0.2P or more. This suppresses generation of an eddy current in the conductor pattern.

The second region A2 is also a range where the influence of a magnetic field generated by supplying a current to the coil pattern is exerted, not to such an extent as the first region A1. If the conductor occupation ratio R of a conductor pattern formed in the second region A2 exceeds 0.8, a generated eddy current or the electrostatic capacitance with the coil pattern degrades coil characteristics. To prevent this, no conductor pattern is formed or the conductor occupation ratio R of the conductor pattern is suppressed to 0.8 or less in the second region A2, as represented by inequality 2.

In the third region A3, if the conductor occupation ratio R of the conductor pattern is 0.3 or less, no reinforcing effect is substantially attained. If the conductor occupation ratio R of a conductor pattern formed in the third region A3 is lower than 0.6 times the conductor occupation ratio of the coil pattern, the current density in plating is biased to concentrate a current on the coil pattern in manufacturing conductive and coil patterns by plating. The conductor pattern in the third region A3 becomes thinner than the coil pattern, so the coil pattern undesirably protrudes. To efficiently generate a magnetic field, the conductor occupation ratio of the coil pattern is desirably 0.5 or more. Hence, as represented by inequality 3, the conductor occupation ratio R of the conductor pattern is set to $0.3 < R \leq 1$ in the third region A3. This relaxes local concentration of the current density in plating, and averages the metal ion diffusion rate within the pattern. Accordingly, the film thickness of the conductor pattern formed by plating is made uniform to prevent the coil pattern from protruding.

Note that the conductor occupation ratio R is the ratio, to the total area of each region, of the total area of all conductor patterns including a dummy pattern formed in the region and a conductor pattern for connecting terminals to each other and a terminal to a coil pattern. When the region includes a portion where no conductor pattern can be formed, e.g., a hole formed in part of the coil, this area is not included in the total area of the region. If the ineffective region includes a portion where the width is partially equal to or smaller than the pitch P of the coil pattern and the conductor pattern is difficult to form, a conductor pattern need not always be formed at this portion.

The conductor pattern (dummy pattern) formed in the ineffective region may have an arbitrary shape. Especially when a linear, slit-like, dot-like, or polygonal conductor pattern is periodically laid out, the conductor occupation ratio R of the conductor pattern is averaged over each region to decrease the thermal expansion and contraction distributions. Thus, the flatness, warpage, and dimensional precision of a conductive circuit can be improved, and the mechanical strength can be reinforced. Also when plating is applied, the current density and ion diffusion rate are averaged to make the plating film thickness more uniform. The layout period (pitch) of such conductor pattern may be constant or random. By setting the period (pitch) to be equal to or more than the pitch P of the coil pattern and equal to or less than 5P, the film thickness can be made more uniform.

Since the peripheral edge of the coil (edge portion such as the outer edge of the coil or the peripheral edge of a hole formed in the coil) requires a sufficient mechanical strength, the conductor pattern (dummy pattern) is desirably formed along the peripheral edge of the coil. However, if the conductor pattern is laid out to form a closed loop at the peripheral edge of a hole formed in the inner portion of the coil pattern to insert a magnetic pole or a hole serving as a light-transmitting portion, an eddy current generated in the conductor pattern cancels a magnetic field to be generated. For this reason, at least a conductor pattern forming a closed loop is not laid out at the peripheral edge of the hole formed at the inner portion of the coil pattern.

It is preferable that the conductor pattern formed at the peripheral edge of the coil have a band shape, and its width be equal to or more than the pitch P of the coil pattern and equal to or less than 4P. A narrower conductor pattern does not substantially reinforce the peripheral edge; or a wider conductor pattern increases the diffusion rate of metal ions in a plating solution and increases the thickness to be much larger than the coil pattern in forming a conductor pattern by plating. If this band-like conductor pattern is formed to be coupled to another conductor pattern in the ineffective region, the coil is reinforced and made more flat. The conductor pattern need not always be formed even at the peripheral edge of the coil as far as the interval between this peripheral edge and the outer edge of the coil pattern is equal to or less than the pitch P of the coil pattern. In this manner, the conductor pattern along the peripheral edge of the coil need not always be completely continuous to form a closed loop, but may be partially disconnected.

A positioning portion such as a circular or oval hole or a recess formed in the outer periphery of the coil is formed in the ineffective region, and a conductor pattern is formed at the peripheral edge of the positioning portion. This increases the mechanical strength around the positioning portion. In the following description, this conductor pattern formed at the peripheral edge of the positioning portion will be called a "guide pattern". Forming the guide pattern prevents the coil from deforming in fitting the positioning portion of the coil on a locking member attached to another building member such as the slider of the magnetic head. The relative positional precision to the optical head can further increase.

The conductor pattern formed in the ineffective region dissipates heat generated by the coil pattern or core formed in the effective region, thereby preventing the temperature rise of the magnetic head. A magnetic head having a heat dissipation member in tight contact with the conductor pattern can obtain high heat dissipation efficiency.

In the ineffective region, a conductor pattern having an appropriate shape can be formed at an appropriate position in accordance with the purpose. If all conductor patterns are formed such that their conductor occupation ratios R satisfy inequalities 1, 2, and 3, the mechanical strength of the coil increases without degrading the electrical characteristics of the coil. All conductor patterns including the coil pattern have almost the same thickness, which prevents some of the conductor patterns from protruding from the coil surface. In bonding the upper surface of the coil to another member such as a core, the lower surface (surface facing the magneto-optical recording medium) of the coil does not protrude or incline. As a result, the coil can be arranged at high precision so as to satisfactorily decrease the distance between its lower surface and the surface of the magneto-optical recording medium in manufacturing a magnetic head. The magnetic field can be efficiently applied to the magneto-optical recording medium.

The present invention implements a magnetic head excellent in heat dissipation characteristics which can increase the relative positional precision between the coil and the optical head and the distance precision from the magneto-optical recording medium, while the coil is downsized to reduce its inductance. This allows setting the magnetic field modulation frequency to 8 MHz or more, and increasing the information signal recording speed.

A flat coil component for the magnetic head according to the present invention can be manufactured by a combination of pattern formation and etching by photolithography, plating, and the like. In particular, when the present invention is applied to a coil formed from a conductor pattern having a thickness larger than the width of the coil pattern, i.e., having a high aspect ratio and a large film thickness, photolithography using a liquid photosensitive resin is optimum. That is, a thick resin setting pattern having a high aspect ratio is formed using a liquid photosensitive resin, and a conductor pattern as a conductive material film is formed as almost thick as the resin setting pattern by plating. If the set substance of the liquid photosensitive resin is not removed but is used as an insulating member, a flat coil component for a magnetic head can be manufactured in which the conductor pattern is as almost thick as the insulating member, which prevents the conductor pattern from protruding. Alternately, the set substance of the liquid photosensitive resin may be removed, and then an insulating member made of a thermosetting resin or the like may be buried to almost the same thickness as the conductor pattern. The insulating member may be formed thicker than the conductor pattern so as to cover the end face of the conductor pattern. Especially when the insulating member is formed as thick as or thicker than the conductor pattern on the upper surface side of the coil that is bonded to another member, the conductor pattern does not protrude, and the coil surface becomes very flat. This further prevents the lower surface of the coil from protruding or inclining upon bonding.

BEST MODE OF CARRYING OUT THE INVENTION

Examples of the present invention will be described in detail below. Note that the present invention is not limited by the examples.

EXAMPLE 1

Figure 11A:
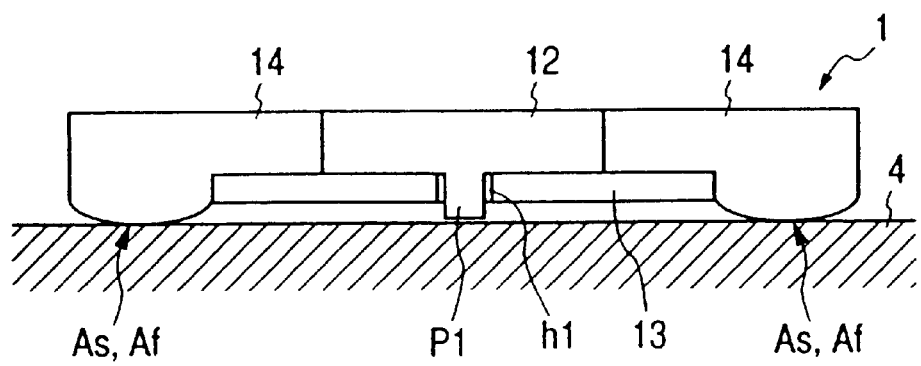
FIGS. 11A and 11B are views, respectively, showing a magnetic head according to Example 1 of the present invention.
Figure 11B:
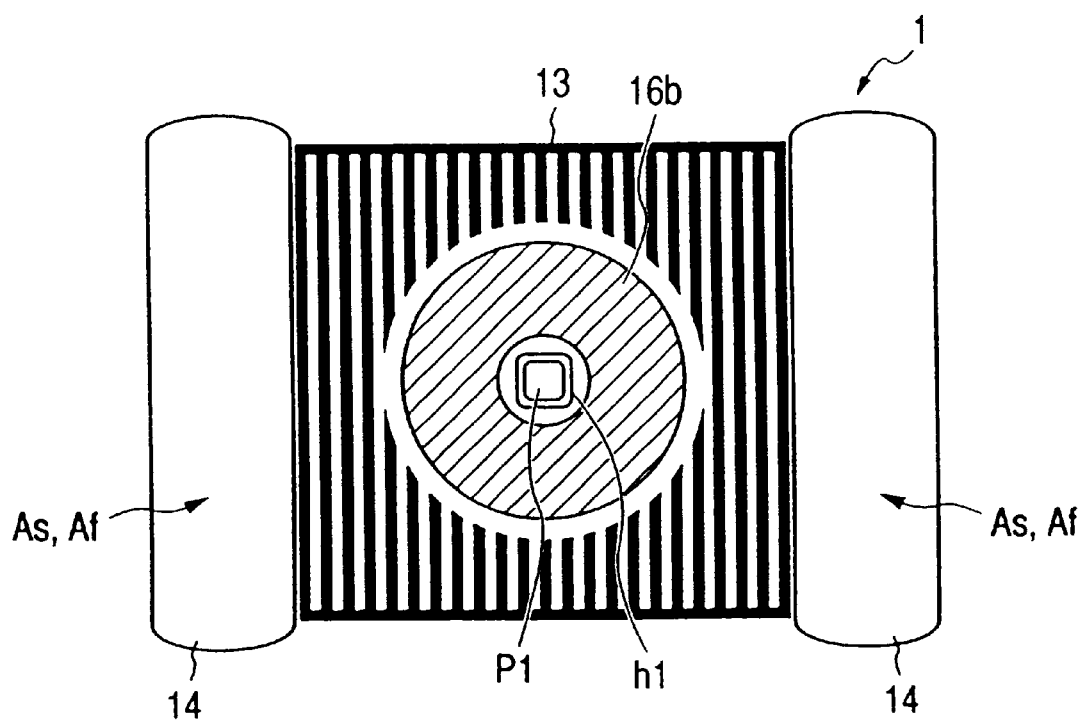

FIGS. 11A and 11B show the structure of a magnetic head 1. FIG. 11A is a side sectional view, and FIG. 11B is a bottom view. The magnetic head 1 is constituted by a core 12 made of a magnetic material such as ferrite, a coil 13, and a slider 14 which mounts them. Reference numeral 4 denotes a magneto-optical disk serving as a magneto-optical recording medium.

The core 12 is made of a magnetic material such as ferrite with a flat shape, and its center has a projecting magnetic pole p1 with a prism shape. The coil 13 is flat, and its center has a square hole h1. The magnetic pole p1 of the core 12 is inserted in the hole h1. The coil 13 is mounted on the slider 14 together with the core 12. The slider 14 is made of a resin material, ceramic material, or the like, and has a sliding surface As or floating surface Af for sliding on or floating/gliding above the magneto-optical disk 4, so as to face the magneto-optical disk 4.

Figure 1:
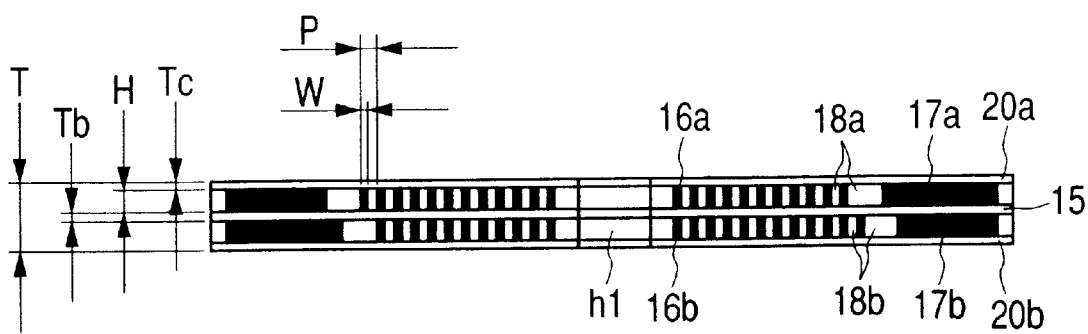
FIG. 1 is a sectional view showing a coil according to Example 1 of the present invention.
Figure 2A:
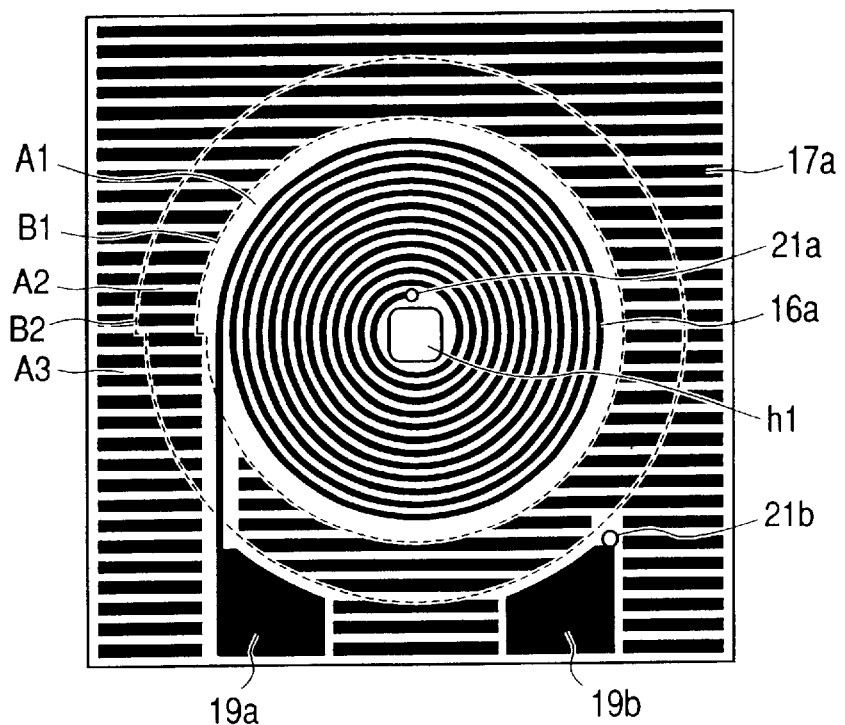
FIGS. 2A and 2B are plan views showing the coil according to Example 1 of the present invention.
Figure 2B:
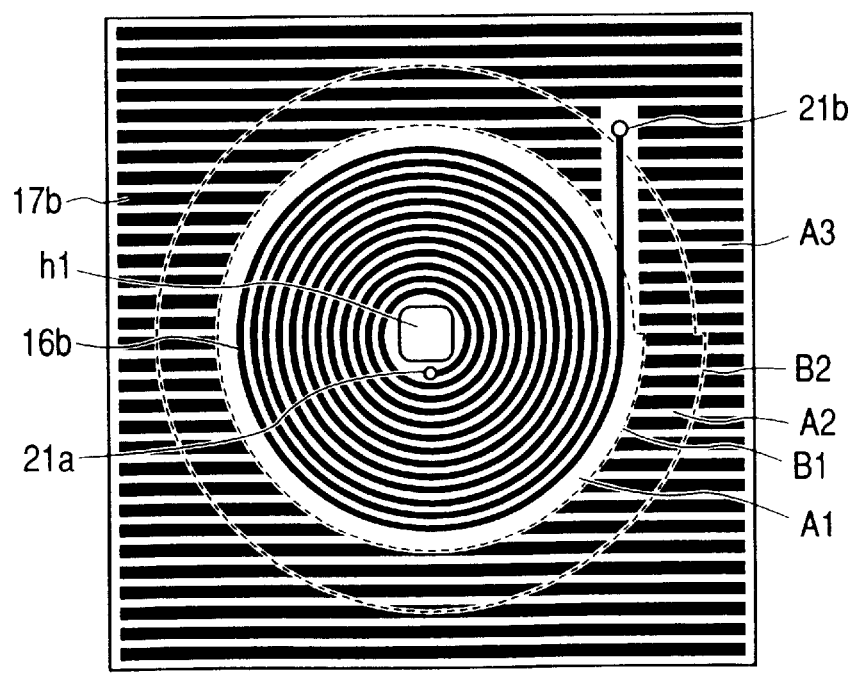

FIGS. 1, 2A, and 2B show the detailed structure of the coil 13. FIG. 1 is a sectional view, FIG. 2A is a plan view when viewed from the top, and FIG. 2B is a plan view when viewed from the bottom. The coil 13 is made up of a base 15, a spiral coil pattern 16a, a dummy pattern 17a, an insulating member 18a, terminals 19b and 19a, a protection coat 20a, which patterns 16a and 17a, member 18a, terminals 19b and 19a, and coat 20a are formed on the upper surface side (side facing the core 12) of the base 15, a spiral coil pattern 16b, a dummy pattern 17b, an insulating member 18b, and a protection coat 20b, which patterns 16b and 17b, member 18b, and coat 20b are formed on the lower surface side (side facing the magneto-optical disk 4) of the base 15. The region where the coil patterns 16a and 16b are formed is an effective region. A current flowing around the magnetic field generation center (hole h1) can be supplied to the coil patterns 16a and 16b. The region outside the effective region where conductor patterns such as the dummy patterns 17a and 17b and the terminals 19a and 19b are formed is an ineffective region. A current flowing around the magnetic field generation center (hole h1) is not supplied to the conductor patterns formed in the ineffective region.

The coil patterns 16a and 16b, dummy patterns 17a and 17b, and terminals 19a and 19b as conductor patterns are made of a conductive material film such as a copper film, and have a thickness H of 50 $\mu$m. The coil patterns 16a and 16b have a width W of 25 $\mu$m, and a constant pitch P of 40 $\mu$m from the inner to outer peripheries. The insulating members 18a and 18b are made of a nonconductive material film, e.g., a photosensitive resin or thermosetting resin film used in forming the coil patterns 16a and 16b. The insulating members 18a and 18b are equal in thickness to conductor patterns such as the coil patterns 16a and 16b. In this manner, the thicknesses of the conductor pattern and insulating member 18a and those of the conductor pattern and insulating member 18b are set equal on the upper and lower surface sides of the coil 13, respectively. This prevents conductor patterns such as the coil patterns 16a and 16b from protruding from the upper and lower surfaces of the coil 13. The surface of the coil 13 can, therefore, be made flat. In FIGS. 2A and 2B, all black portions are conductor patterns made of a conductive material film, and all surrounding blank portions are the insulating member 18a (upper surface side) or 18b (lower surface side).

The coil patterns 16a and 16b are connected at an inner peripheral portion via a through hole 21a. The terminal 19a is connected to the outer peripheral portion of the coil pattern 16a, whereas the terminal 19b is connected to that of the coil pattern 16b via a through hole 21b. The terminals 19a and 19b can supply a DC current to the coil patterns 16a and 16b.

The base 15 is formed to electrically insulate the coil patterns 16a and 16b, and is made of a thin resin material sheet such as a polyimide sheet. An interval Tb (almost equal to the thickness of the base 15 in Example 1) between the coil patterns 16a and 16b is 20 $\mu$m. The protection coats 20a and 20b are thin films or sheets made of a nonconductive material such as a resin material and prevent damage and corrosion of the surfaces of the coil patterns 16a and 16b. The protection coats 20a and 20b have a thickness Tc of 20 $\mu$m.

Since the dummy patterns 17a and 17b are formed in the ineffective regions around the coil patterns 16a and 16b, the thickness T of the coil 13 is uniformly 160 $\mu$m on almost the entire surface. Compared to a case in which no dummy pattern is formed, the mechanical strength of the coil 13 increases. The coil 13 is satisfactorily rigid, and does not deform, e.g., bend when the coil 13 is bonded to the core 12, mounted on the slider 14, and fixed in manufacturing a magnetic head. Since the upper surface (surface facing the core 12) of the coil 13 is flat, its lower surface (surface facing the magneto-optical disk 4) does not deform, e.g., protrude or incline upon bonding to the core 12.

When the coil 13 is formed from a plurality of coil patterns, like Example 1, the interval Tb between these coil patterns must be 70 $\mu$m or less, and desirably, 35 $\mu$m or less. This can increase the coil pattern space factor (ratio of the conductor pattern to the remaining portion on the section) to efficiently generate a magnetic field. The coil pattern and the conductor pattern (dummy pattern) formed in the ineffective region are desirably formed such that the thickness T of the coil 13 is set to 70 $\mu$m or more.

If coil patterns are formed on both the upper and lower surface sides of the coil, and conductor patterns (dummy patterns) are formed in the ineffective regions on the two sides, like Example 1, expansion/contraction caused by temperature changes occurs to almost the same degree on the upper and lower surface sides of the coil, and the coil does not deform, e.g., warp.

The conductor patterns, i.e., dummy patterns 17a and 17b formed in the ineffective region in Example 1 will be described in detail.

In Example 1, the pitch P of the coil patterns 16a and 16b is 40 μm. A region where a distance S from the outer edge of each of the coil patterns 16a and 16b satisfies 0 μm≦S≦60 μm is defined as a first region A1 on both the upper and lower surface sides of the coil 13 in accordance with inequalities 1, 2, and 3; a region where the distance S satisfies 60 μm<S≦240 μm, as a second region A2; and a region where the distance S satisfies 240 μm<S, as a third region A3. In FIGS. 2A and 2B, a broken line B1 represents the boundary between the first and second regions A1 and A2, and a broken line B2 represents the boundary between the second and third regions A2 and A3.

The dummy patterns 17a and 17b are formed in the respective regions as follows. No dummy pattern is formed in the first region A1 on both the upper and lower surface sides of the coil 13. Hence, the conductor occupation ratio R of the conductor pattern is 0 in the first region A1 on both the upper and lower surface sides. The dummy patterns 17a and 17b are formed from striped conductor patterns in the second and third regions A2 and A3 on both the upper and lower surface sides of the coil 13. The striped conductor patterns have a width of 40 μm and a pitch of 60 μm. The terminals 19a and 19b are formed in the third region A3 on the upper surface side of the coil 13. The conductor occupation ratio R of the conductor pattern is about 0.60 in the second region A2 on both the upper and lower surface sides of the coil 13, about 0.63 in the third region A3 on the upper surface side, and about 0.60 in the third region A3 on the lower surface side.

In this way, the ineffective region is divided into a plurality of regions on the basis of the distance S from the outer edge of the coil pattern (outer edge of the effective region). Conductor patterns are laid out in the respective regions so as to simultaneously satisfy inequalities 1, 2, and 3. In the first region A1, no conductor pattern forms any closed loop. Accordingly, the reinforcing effect can be obtained without degrading the electrical characteristics of the coil.

EXAMPLE 2

Figure 3A:
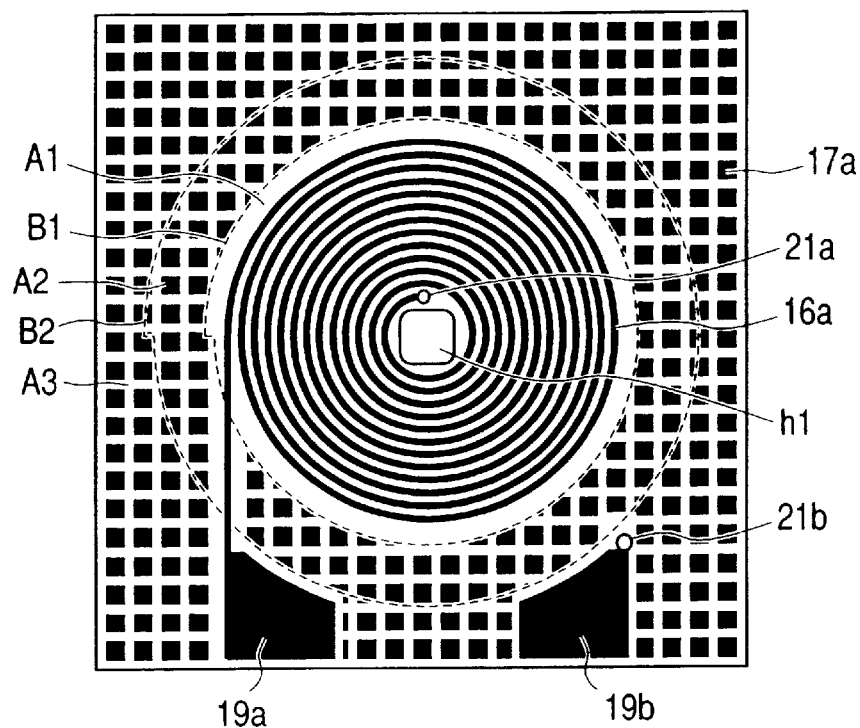
FIGS. 3A and 3B are plan views showing a coil according to Example 2 of the present invention.
Figure 3B:
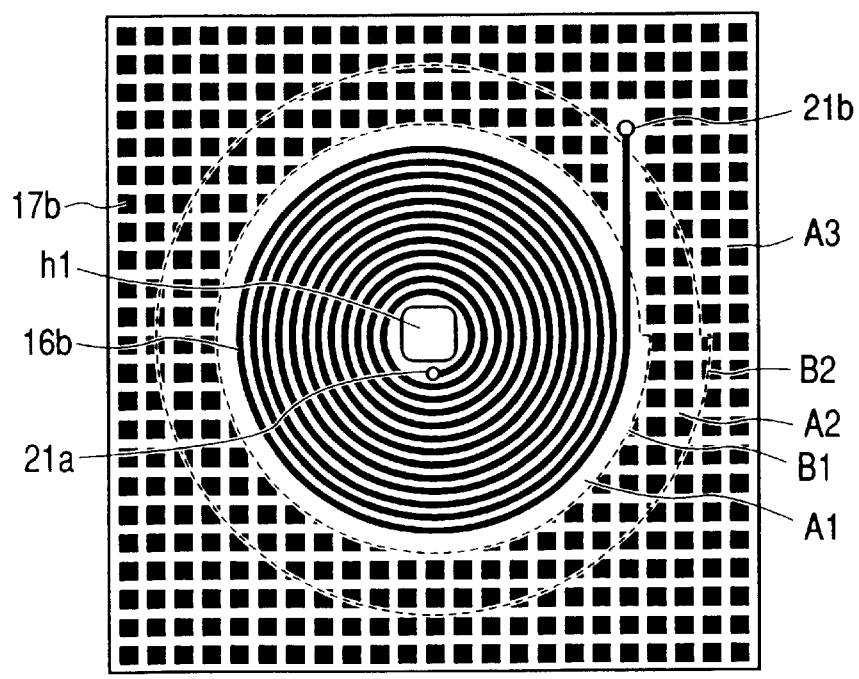

Example 2 of the present invention will be described. A magnetic head in Example 2 has the same structure as that in Example 1 shown in FIG. 11, and a description thereof will be omitted. FIGS. 3A and 3B show the detailed structure of a coil 13 in Example 2. FIG. 3A is a plan view when viewed from the top, and FIG. 3B is a plan view when viewed from the bottom.

The structure except for conductor patterns formed in the ineffective region is the same as that in Example 1 shown in FIGS. 1 and 2, and a description thereof will be omitted.

The conductor patterns, i.e., dummy patterns 17a and 17b formed in the ineffective region in Example 2 will be described.

Also in Example 2, a region where the distance S from the outer edge of each of coil patterns 16a and 16b satisfies 0 μm≦S≦60 μm is defined as a first region A1 on both the upper and lower surface sides of the coil 13 in accordance with inequalities 1, 2, and 3; a region where the distance S satisfies 60 μm<S≦240 μm, as a second region A2; and a region where the distance S satisfies 240 μm<S, as a third region A3. In FIGS. 3A and 3B, a broken line B1 represents the boundary between the first and second regions A1 and A2, and a broken line B2 represents the boundary between the second and third regions A2 and A3.

The dummy patterns are formed in the respective regions as follows. No dummy pattern is formed in the first region A1 on both the upper and lower surface sides of the coil 13. For this reason, the conductor occupation ratio R of the conductor pattern is 0 in the first region A1 on both the upper and lower surface sides. The dummy patterns 17a and 17b are formed from square-dot-like conductor patterns in the second and third regions A2 and A3 on both the upper and lower surface sides of the coil 13. The square-dot-like conductor patterns have a side length of 60 μm and a layout pitch of 80 μm. Terminals 19a and 19b are formed in the third region A3 on the upper surface side of the coil 13. The conductor occupation ratio R of the conductor pattern is about 0.56 in the second region A2 on both the upper and lower surface sides of the coil 13, about 0.59 in the third region A3 on the upper surface side, and about 0.56 in the third region A3 on the lower surface side.

EXAMPLE 3

Figure 4A:
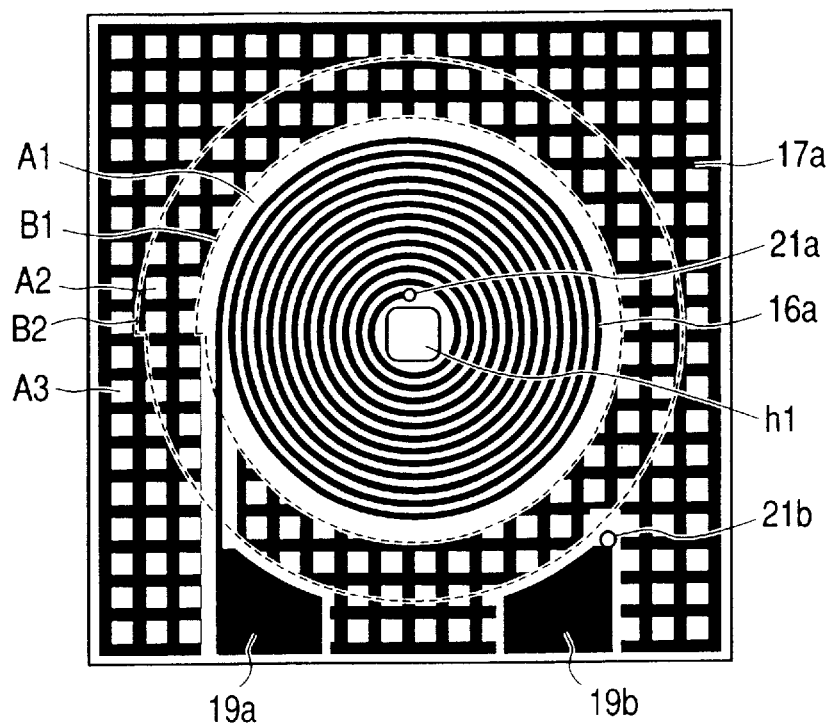
FIGS. 4A and 4B are plan views showing a coil according to Example 3 of the present invention.
Figure 4B:
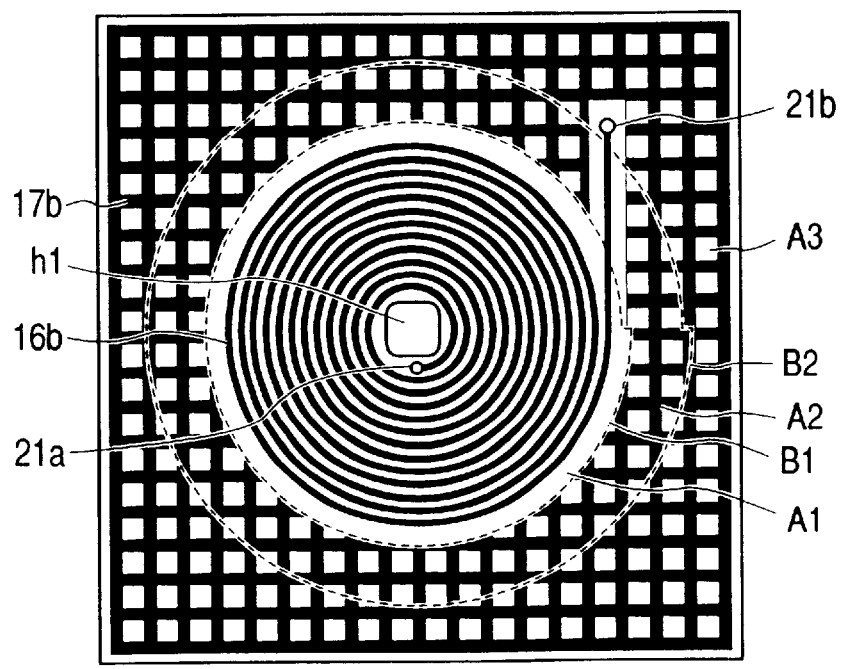

Example 3 of the present invention will be described. A magnetic head in Example 3 has the same structure as that in Example 1 shown in FIGS. 11A and 11B, and a description thereof will be omitted. FIGS. 4A and 4B show the detailed structure of a coil 13 in Example 3. FIG. 4A is a plan view when viewed from the top, and FIG. 4B is a plan view when viewed from the bottom.

The structure except for conductor patterns formed in the ineffective region is the same as that in Example 1 shown in FIGS. 1, 2A, and 2B, and a description thereof will be omitted.

The conductor patterns, i.e., dummy patterns 17a and 17b formed in the ineffective region in Example 3 will be described.

Also in Example 3, a region where the distance S from the outer edge of each of coil patterns 16a and 16b satisfies 0 μm≦S≦60 μm is defined as a first region A1 on both the upper and lower surface sides of the coil 13 in accordance with inequalities 1, 2, and 3; a region where the distance S satisfies 60 μm<S≦240 μm, as a second region A2; and a region where the distance S satisfies 240 μm<S, as a third region A3. In FIGS. 4A and 4B, a broken line B1 represents the boundary between the first and second regions A1 and A2, and a broken line B2 represents the boundary between the second and third regions A2 and A3.

The dummy patterns are formed in the respective regions as follows. No dummy pattern is formed in the first region A1 on both the upper and lower surface sides of the coil 13. Therefore, the conductor occupation ratio R of the conductor pattern is 0 in the first region A1 on both the upper and lower surface sides. The dummy patterns 17a and 17b are formed from square-matrix-like conductor patterns in the second and third regions A2 and A3 on both the upper and lower surface sides of the coil 13. The square-matrix-like conductor patterns have a width of 40 μm and a pitch of 100 μm. Terminals 19a and 19b are formed in the third region A3 on the upper surface side of the coil 13. The conductor occupation ratio R of the conductor pattern is about 0.64 in the second region A2 on both the upper and lower surface sides of the coil 13, about 0.67 in the third region A3 on the upper surface side, and about 0.64 in the third region A3 on the lower surface side.

EXAMPLE 4

Figure 5A:
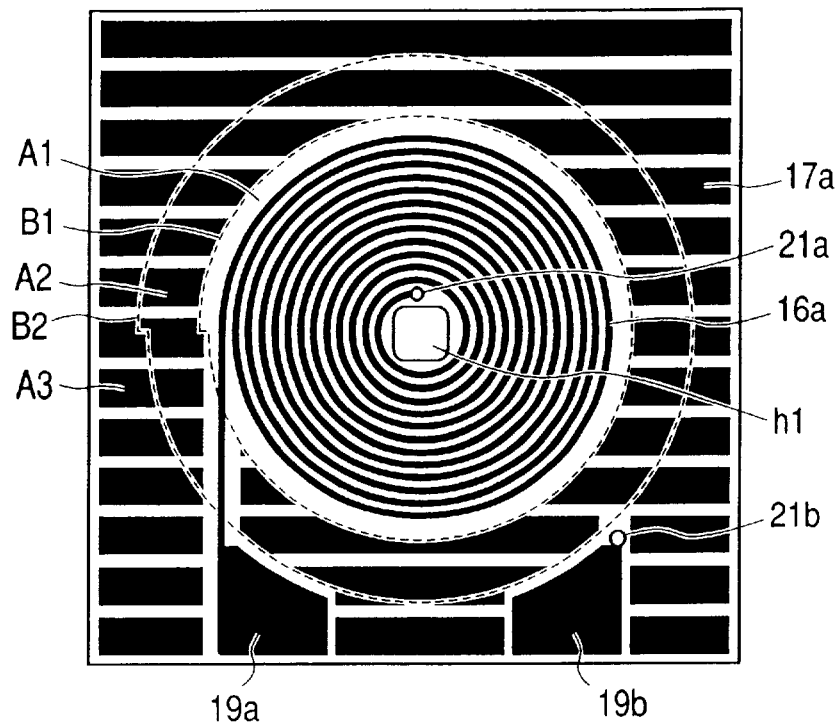
FIGS. 5A and 5B are plan views showing a coil according to Example 4 of the present invention.
Figure 5B:
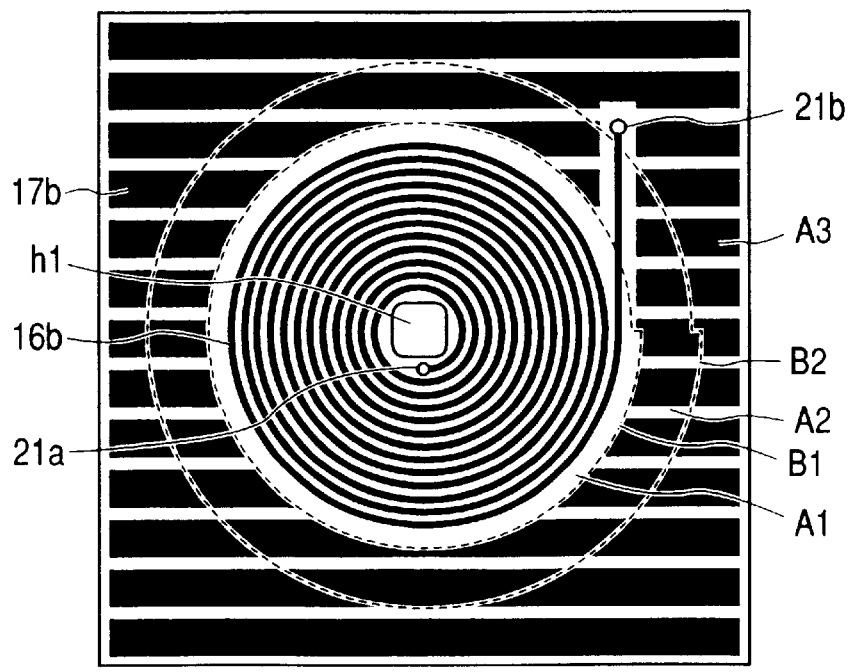

Example 4 of the present invention will be described. A magnetic head in Example 4 has the same structure as that in Example 1 shown in FIGS. 11A and 11B, and a description thereof will be omitted. FIGS. 5A and 5B show the detailed structure of a coil 13 in Example 4. FIG. 5A is a plan view when viewed from the top, and FIG. 5B is a plan view when viewed from the bottom.

The structure except for conductor patterns formed in the ineffective region is the same as that in Example 1 shown in FIGS. 1, 2A, and 2B, and a description thereof will be omitted.

The conductor patterns, i.e., dummy patterns 17a and 17b formed in the ineffective region in Example 4 will be described.

Also in Example 4, a region where the distance S from the outer edge of each of coil patterns 16a and 16b satisfies 0 $\mu m \leq S \leq 60$ $\mu m$ is defined as a first region A1 on both the upper and lower surface sides of the coil 13 in accordance with inequalities 1, 2, and 3; a region where the distance S satisfies 60 $\mu m < S \leq 240$ $\mu m$, as a second region A2; and a region where the distance S satisfies 240 $\mu m < S$, as a third region A3. In FIGS. 5A and 5B, a broken line B1 represents the boundary between the first and second regions A1 and A2, and a broken line B2 represents the boundary between the second and third regions A2 and A3.

The dummy patterns 17a and 17b are formed in the respective regions as follows. No dummy pattern is formed in the first region A1 on both the upper and lower surface sides of the coil 13. The conductor occupation ratio R of the conductor pattern is 0 in the first region A1 on both the upper and lower surface sides. The dummy patterns 17a and 17b are formed from striped conductor patterns in the second and third regions A2 and A3 on both the upper and lower surface sides of the coil 13. The striped conductor patterns have a width of 115 $\mu m$ and a pitch of 150 $\mu m$. Terminals 19a and 19b are formed in the third region A3 on the upper surface side of the coil 13. The conductor occupation ratio R of the conductor pattern is about 0.77 in the second and third regions A2 and A3 on both the upper and lower surface sides of the coil 13.

EXAMPLE 5

Figure 6A:
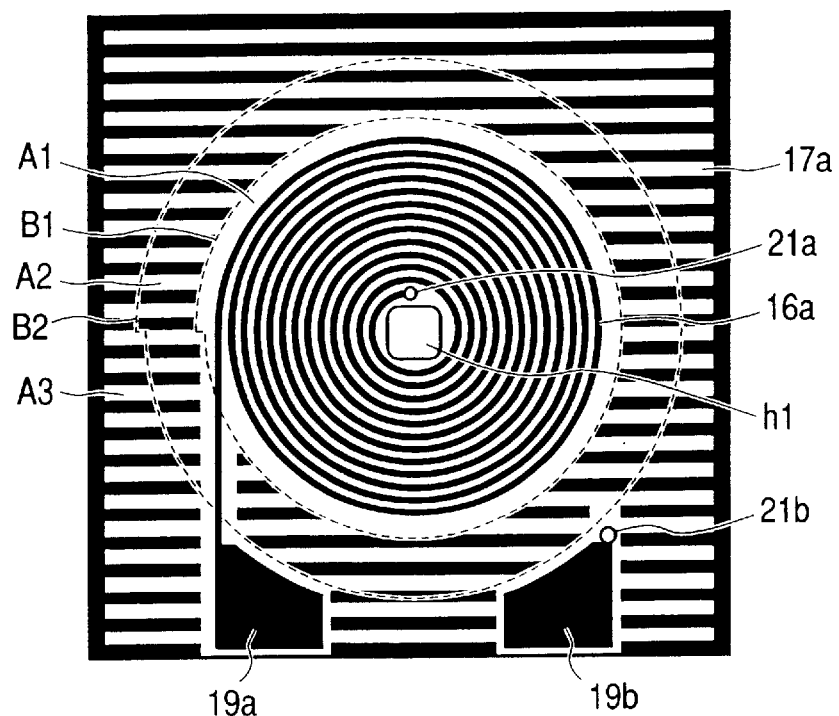
FIGS. 6A and 6B are plan views showing a coil according to Example 5 of the present invention.
Figure 6B:
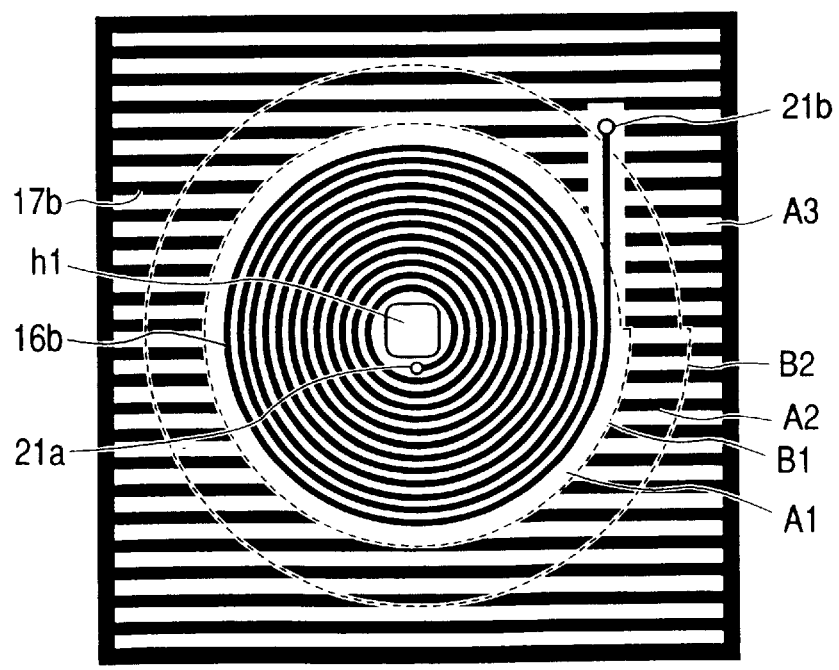

Example 5 of the present invention will be described. A magnetic head in Example 5 has the same structure as that in Example 1 shown in FIGS. 11A and 11B, and a description thereof will be omitted. FIGS. 6A and 6B show the detailed structure of a coil 13 in Example 5. FIG. 6A is a plan view when viewed from the top, and FIG. 6B is a plan view when viewed from the bottom.

The structure except for conductor patterns formed in the ineffective region is the same as that in Example 1 shown in FIGS. 1, 2A, and 2B, and a description thereof will be omitted.

The conductor patterns, i.e., dummy patterns 17a and 17b formed in the ineffective region in Example 5 will be described.

Also in Example 5, a region where the distance S from the outer edge of each of coil patterns 16a and 16b satisfies 0 $\mu m \leq S \leq 60$ $\mu m$ is defined as a first region A1 on both the upper and lower surface sides of the coil 13 in accordance with inequalities 1, 2, and 3; a region where the distance S satisfies 60 $\mu m < S \leq 240$ $\mu m$, as a second region A2; and a region where the distance S satisfies 240 $\mu m < S$, as a third region A3. In FIGS. 6A and 6B, a broken line B1 represents the boundary between the first and second regions A1 and A2, and a broken line B2 represents the boundary between the second and third regions A2 and A3.

The dummy patterns 17a and 17b are formed in the respective regions as follows. No dummy pattern is formed in the first region A1 on both the upper and lower surface sides of the coil 13. Hence, the conductor occupation ratio R of the conductor pattern is 0 in the first region A1 on both the upper and lower surface sides. The dummy patterns 17a and 17b are formed from striped conductor patterns in the second and third regions A2 and A3 on both the upper and lower surface sides of the coil 13. The striped conductor patterns have a width of 40 $\mu m$ and a pitch of 80 $\mu m$. In the third region A3, the dummy patterns 17a and 17b are further formed from 70-$\mu m$ wide band-like conductor patterns formed along the outer edge of the coil 13. The band-like conductor pattern along the outer edge and the striped conductor pattern are coupled to each other. Terminals 19a and 19b are formed in the third region A3 on the upper surface side of the coil 13. The conductor occupation ratio R of the conductor pattern is about 0.50 in the second region A2 on both the upper and lower surface sides of the coil 13, about 0.55 in the third region A3 on the upper surface side, and about 0.52 in the third region A3 on the lower surface side.

EXAMPLE 6

Figure 7A:
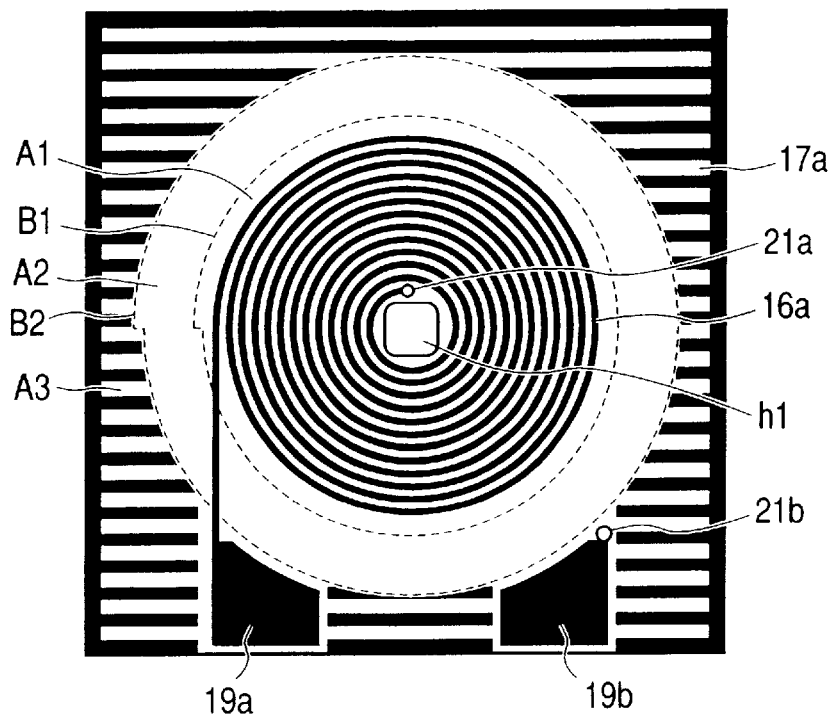
FIGS. 7A and 7B are plan views showing a coil according to Example 6 of the present invention.
Figure 7B:
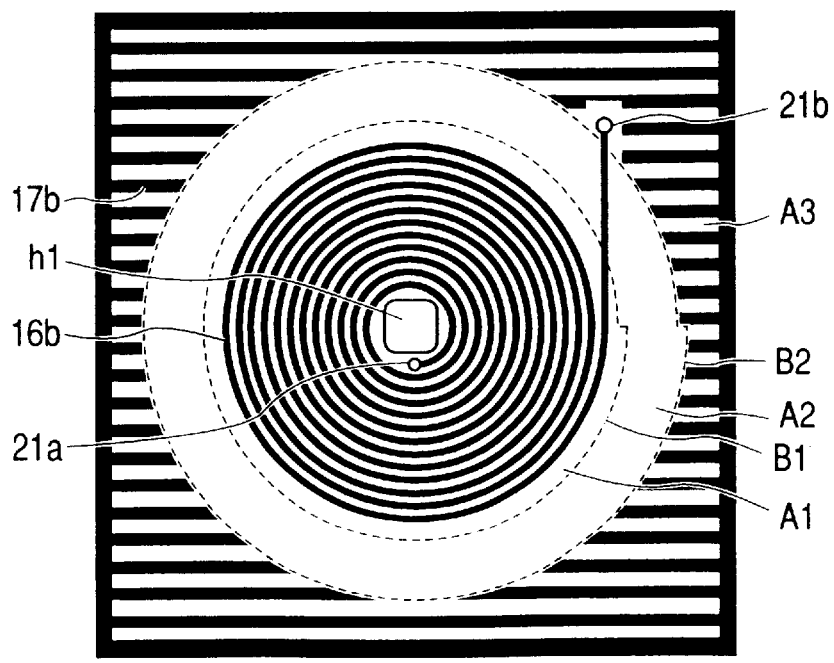

Example 6 of the present invention will be described. A magnetic head in Example 6 has the same structure as that in Example 1 shown in FIGS. 11A and 11B, and a description thereof will be omitted. FIGS. 7A and 7B show the detailed structure of a coil 13 in Example 6. FIG. 7A is a plan view when viewed from the top, and FIG. 7B is a plan view when viewed from the bottom.

The structure except for conductor patterns formed in the ineffective region is the same as that in Example 1 shown in FIGS. 1, 2A, and 2B, and a description thereof will be omitted.

The conductor patterns, i.e., dummy patterns 17a and 17b formed in the ineffective region in Example 6 will be described.

Also in Example 6, a region where the distance S from the outer edge of each of coil patterns 16a and 16b satisfies 0 $\mu m \leq S \leq 60$ $\mu m$ is defined as a first region A1 on both the upper and lower surface sides of the coil 13 in accordance with inequalities 1, 2, and 3; a region where the distance S satisfies 60 $\mu m < S \leq 240$ $\mu m$, as a second region A2; and a region where the distance S satisfies 240 $\mu m < S$, as a third region A3. In FIGS. 7A and 7B, a broken line B1 represents the boundary between the first and second regions A1 and A2, and a broken line B2 represents the boundary between the second and third regions A2 and A3.

The dummy patterns 17a and 17b are formed in the respective regions as follows. No dummy pattern is formed in the first and second regions A1 and A2 on both the upper and lower surface sides of the coil 13. Thus, the conductor occupation ratio R of the conductor pattern is 0 in the first and second regions A1 and A2 on both the upper and lower surface sides. In the third region A3 on both the upper and lower surface sides of the coil 13, the dummy patterns 17a and 17b are formed from striped conductor patterns having a width of 40 $\mu m$ and a pitch of 80 $\mu m$, and 70-$\mu m$ wide band-like conductor patterns formed along the outer edge of the coil 13. The band-like conductor pattern along the outer edge and the striped conductor pattern are coupled to each other. Terminals 19a and 19b are formed in the third region A3 on the upper surface side of the coil 13. The conductor occupation ratio R of the conductor pattern is about 0.55 in the third region A3 on the upper surface side of the coil 13, and about 0.52 in the third region A3 on the lower surface side.

EXAMPLE 7

Figure 8A:
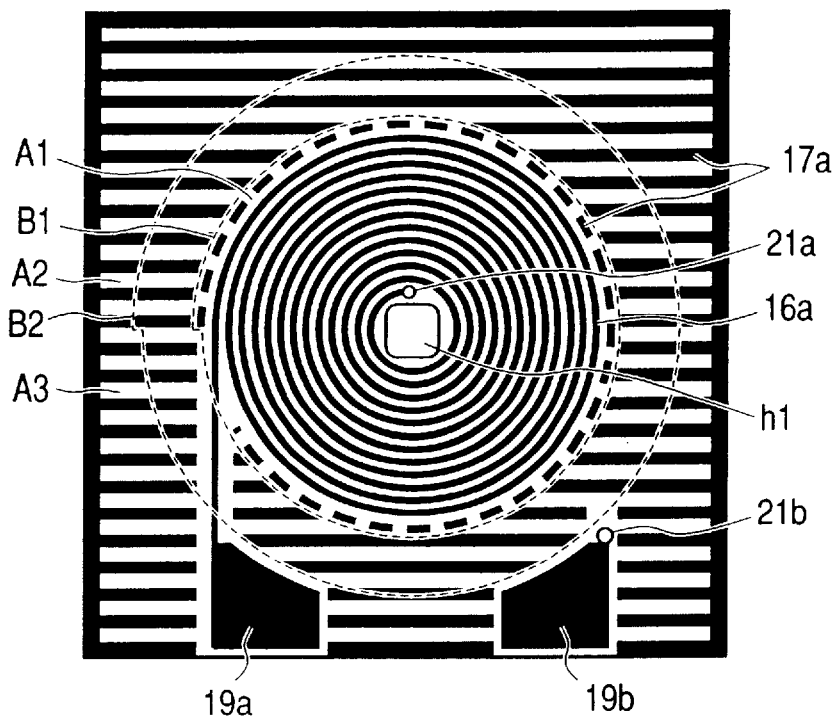
FIGS. 8A and 8B are plan views showing a coil according to Example 7 of the present invention.
Figure 8B:
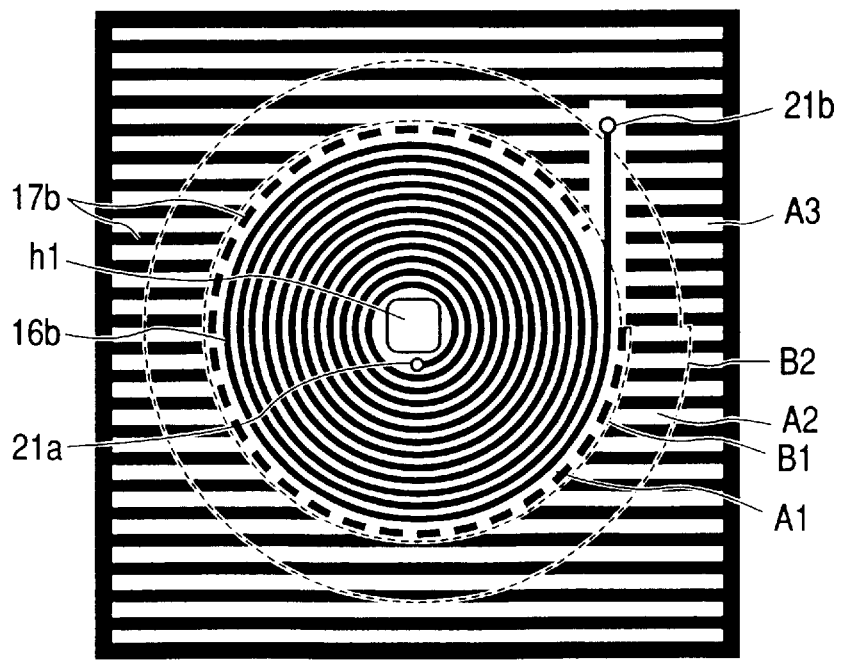

Example 7 of the present invention will be described. A magnetic head in Example 7 has the same structure as that in Example 1 shown in FIGS. 11A and 11B, and a description thereof will be omitted. FIGS. 8A and 8B show the detailed structure of a coil 13 in Example 7. FIG. 8A is a plan view when viewed from the top, and FIG. 8B is a plan view when viewed from the bottom.

The structure except for conductor patterns formed in the ineffective region is the same as that in Example 1 shown in FIGS. 1, 2A, and 2B, and a description thereof will be omitted.

The conductor patterns, i.e., dummy patterns 17a and 17b formed in the ineffective region in Example 7 will be described.

Also in Example 7, a region where the distance S from the outer edge of each of coil patterns 16a and 16b satisfies 0 $\mu m \leq S \leq 60$ $\mu m$ is defined as a first region A1 on both the upper and lower surface sides of the coil 13 in accordance with inequalities 1, 2, and 3; a region where the distance S satisfies 60 $\mu m < S \leq 240$ $\mu m$, as a second region A2; and a region where the distance S satisfies 240 $\mu m < S$, as a third region A3. In FIGS. 8A and 8B, a broken line B1 represents the boundary between the first and second regions A1 and A2, and a broken line B2 represents the boundary between the second and third regions A2 and A3.

The dummy patterns 17a and 17b are formed in the respective regions as follows. In the first region A1 on both the upper and lower surface sides of the coil 13, the dummy patterns 17a and 17b are formed from a plurality of conductor patterns laid out in the spiral direction of the coil patterns 16a and 16b. The conductor patterns have a width of 25 $\mu m$ and a length of 60 $\mu m$, and the interval between respective conductor patterns is 30 $\mu m$. The interval between this conductor pattern and the outer edge of the coil pattern 16a or 16b is 35 $\mu m$. The conductor occupation ratio R of the conductor pattern is about 0.28 in the first region A1. In the second and third regions A2 and A3 on both the upper and lower surface sides of the coil 13, the dummy patterns 17a and 17b are formed from striped conductor patterns. The striped conductor patterns have a width of 40 $\mu m$ and a pitch of 80 $\mu m$. In the third region A3, the dummy patterns 17a and 17b are further formed from 70-$\mu m$ wide band-like conductor patterns formed along the outer edge of the coil 13. The band-like conductor pattern along the outer edge and the striped conductor pattern are coupled to each other. Terminals 19a and 19b are formed in the third region A3 on the upper surface side of the coil 13. The conductor occupation ratio R of the conductor pattern is about 0.50 in the second region A2 on both the upper and lower surface sides of the coil 13, about 0.55 in the third region A3 on the upper surface side, and about 0.52 in the third region A3 on the lower surface side.

EXAMPLE 8

Figure 9A:
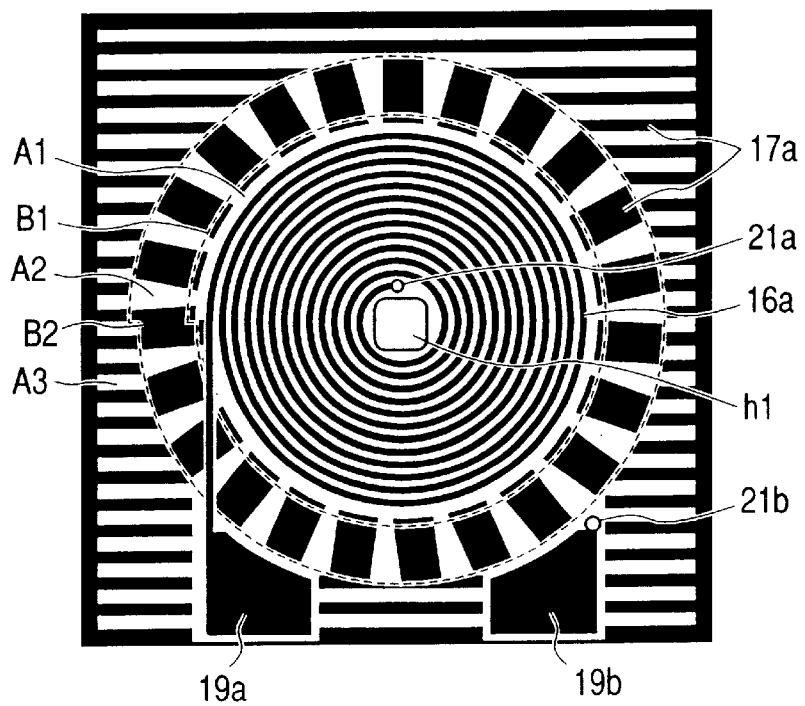
FIGS. 9A and 9B are plan views showing a coil according to Example 8 of the present invention.
Figure 9B:
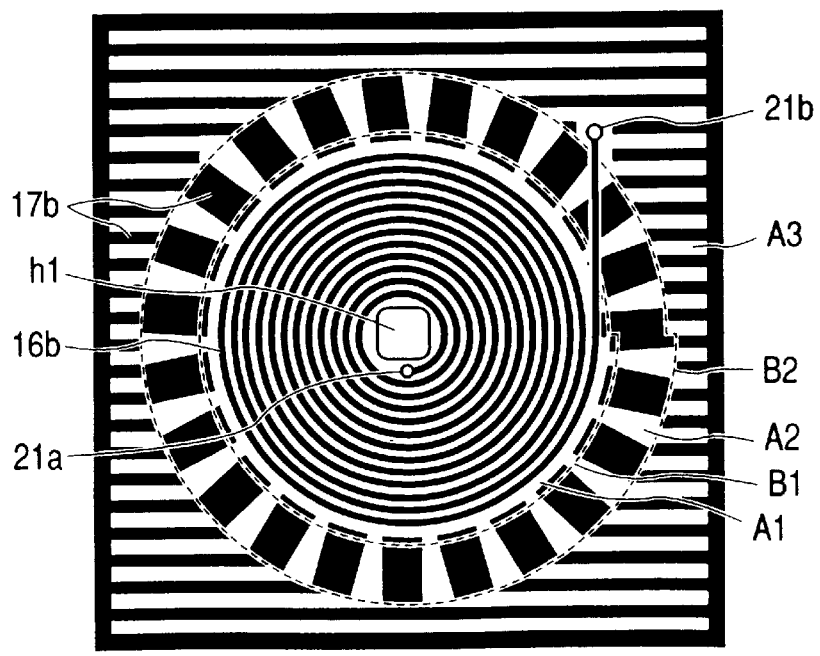

Example 8 of the present invention will be described. A magnetic head in Example 8 has the same structure as that in Example 1 shown in FIGS. 11A and 11B, and a description thereof will be omitted. FIGS. 9A and 9B show the detailed structure of a coil 13 in Example 8. FIG. 9A is a plan view when viewed from the top, and FIG. 9B is a plan view when viewed from the bottom.

The structure except for conductor patterns formed in the ineffective region is the same as that in Example 1 shown in FIGS. 1, 2A, and 2B, and a description thereof will be omitted.

The conductor patterns, i.e., dummy patterns 17a and 17b formed in the ineffective region in Example 8 will be described.

Also in Example 8, a region where the distance S from the outer edge of each of coil patterns 16a and 16b satisfies 0 $\mu m \leq S \leq 60$ $\mu m$ is defined as a first region A1 on both the upper and lower surface sides of the coil 13 in accordance with inequalities 1, 2, and 3; a region where the distance S satisfies 60 $\mu m < S \leq 240$ $\mu m$, as a second region A2; and a region where the distance S satisfies 240 $\mu m < S$, as a third region A3. In FIGS. 9A and 9B, a broken line B1 represents the boundary between the first and second regions A1 and A2, and a broken line B2 represents the boundary between the second and third regions A2 and A3.

The dummy patterns 17a and 17b are formed in the respective regions as follows. In the first region A1 and second region A2 on both the upper and lower surface sides of the coil 13, the dummy patterns 17a and 17b are formed from a plurality of radial conductor patterns. The conductor patterns have a width of 100 $\mu m$ and a length of 205 $\mu m$, and the interval between respective conductor patterns is, 70 to 120 $\mu m$. The interval between this conductor pattern and the outer edge of the coil pattern 16a or 16b is 35 $\mu m$. On both the upper and lower surface sides, the conductor occupation ratio R of the conductor pattern is about 0.25 in the first region A1, and about 0.55 in the second region A2. In the third region A3 on both the upper and lower surface sides of the coil 13, the dummy patterns 17a and 17b are formed from striped conductor patterns having a width of 40 $\mu m$ and a pitch of 80 $\mu m$, and 70-$\mu m$ wide band-like conductor patterns formed along the outer edge of the coil 13. The band-like conductor pattern along the outer edge and the striped conductor pattern are coupled to each other. Terminals 19a and 19b are formed in the third region A3 on the upper surface side of the coil 13. The conductor occupation ratio R of the conductor pattern is about 0.55 in the third region A3 on the upper surface side of the coil 13, and about 0.52 in the third region A3 on the lower surface side.

EXAMPLE 9

Figure 12A:
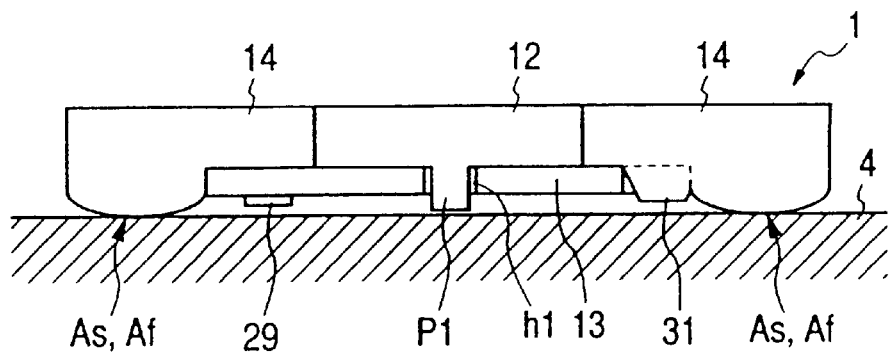
FIGS. 12A and 12B are views, respectively, showing a magnetic head according to Example 9 of the present invention.
Figure 12B:
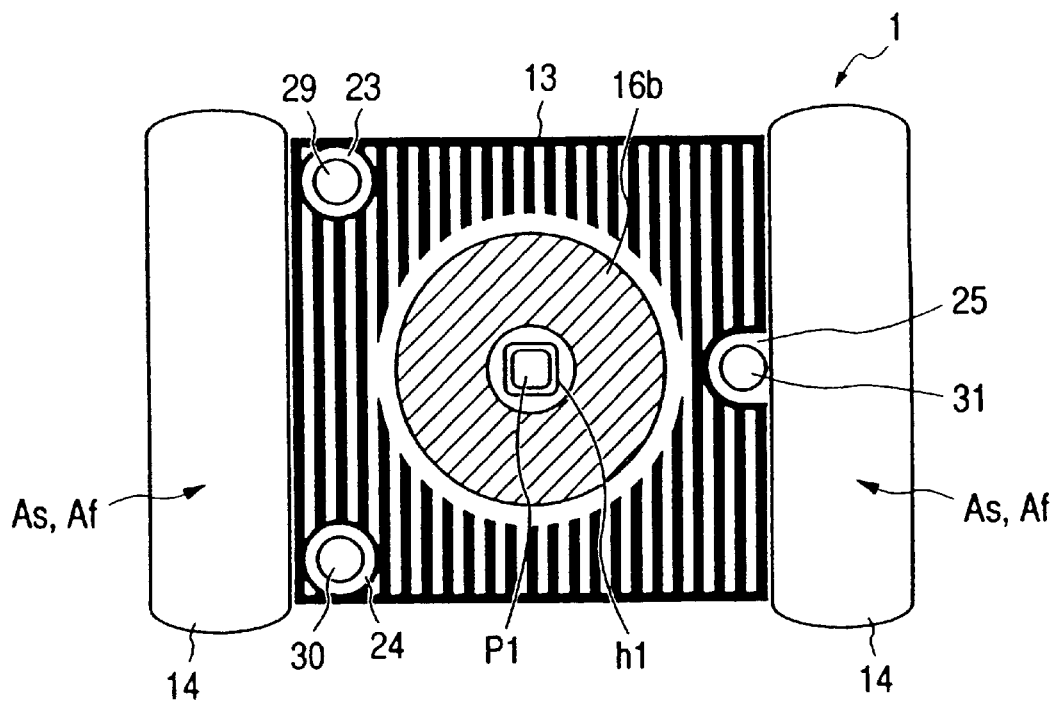

Example 9 of the present invention will be described. FIGS. 12A and 12B show the structure of a magnetic head 1. FIG. 12A is a side sectional view, and FIG. 12B is a bottom view. The magnetic head 1 is constituted by a core 12 made of a magnetic material such as ferrite, a coil 13, and a slider 14 which mounts them. Reference numeral 4 denotes a magneto-optical disk serving as a magneto-optical recording medium.

The core 12 is made of a magnetic material such as ferrite with a flat shape, and its center has a projecting magnetic pole p1 with a prism shape. The coil 13 is flat, and its center has a square hole h1. The magnetic pole p1 of the core 12 is inserted in the hole h1. The coil 13 is mounted on the slider 14 together with the core 12. The slider 14 is made of a resin material, ceramic material, or the like, and has a sliding surface As or floating surface Af for sliding on or floating/gliding above the magneto-optical disk 4, so as to face the magneto-optical disk 4.

The slider 14 has locking members 29, 30, and 31 projecting from the attaching surface of the coil 13. The coil 13 has positioning portions 23, 24, and 25. The positioning portions 23 and 24 are circular holes, and the positioning portion 25 is a U-shaped recess formed in the outer edge of the coil 13. The coil 13 is attached to the slider 14 by fitting the positioning portions 23, 24, and 25 on the locking members 29, 30, and 31 of the slider 14.

Figure 10A:
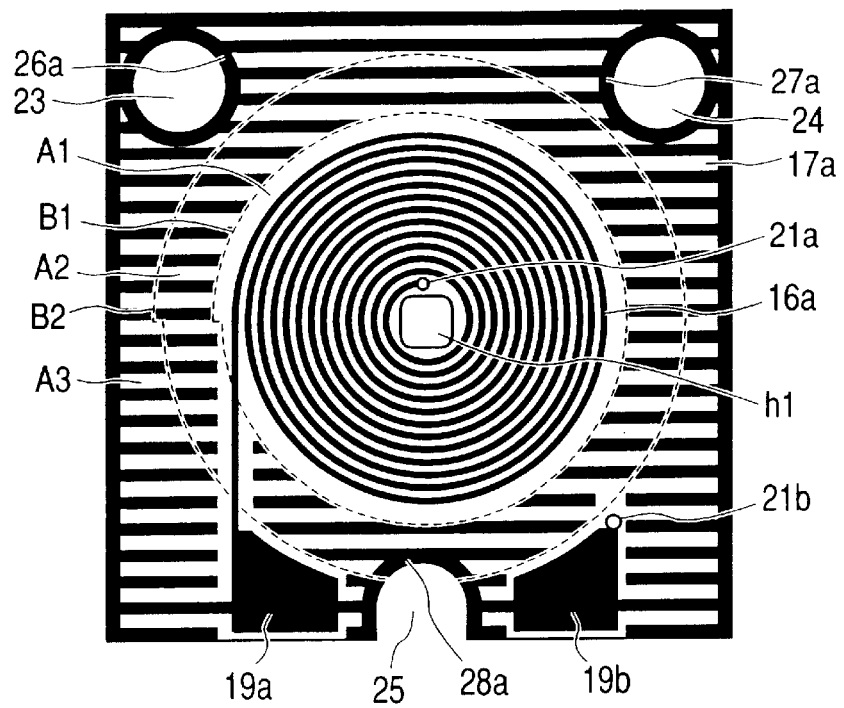
FIGS. 10A and 10B are plan views showing a coil according to Example 9 of the present invention.
Figure 10B:
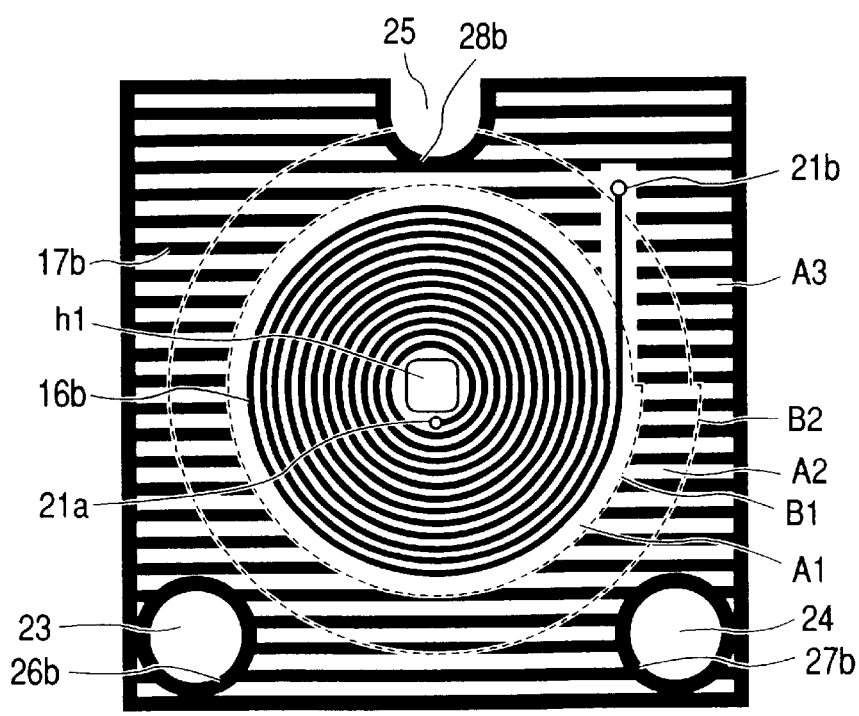

FIGS. 10A and 10B show the detailed structure of the coil 13. FIG. 10A is a plan view when viewed from the top, and FIG. 10B is a plan view when viewed from the bottom. The coil 13 is flat and made up of a base 15, a spiral coil pattern 16a, a dummy pattern 17a, guide patterns 26a, 27a, and 28a, an insulating member 18a, terminals 19b and 19a, a protection coat 20a, which patterns 16a, 17a, 26a, 27a, and 28a, member 18a, terminals 19b and 19a, and coat 20a are formed on the upper surface side (side facing the core 12) of the base 15, a spiral coil pattern 16b, a dummy pattern 17b, guide patterns 26b, 27b, and 28b, an insulating member 18b, and a protection coat 20b, which patterns 16b, 17b, 26b, 27b, and 28b, member 18b, and coat 20b are formed on the lower surface side (side facing the magneto-optical disk 4) of the base 15. The coil patterns 16a and 16b are formed in an effective region, and a current flowing around the magnetic field generation center (hole h1) can be supplied to the coil patterns 16a and 16b. The dummy patterns 17a and 17b, guide patterns 26a, 27a, 28a, 26b, 27b, and 28b, and terminals 19a and 19b are formed in an ineffective region, and a current flowing around the magnetic field generation center (hole h1) is not supplied to them.

The coil patterns 16a and 16b, dummy patterns 17a and 17b, guide patterns 26a, 27a, 28a, 26b, 27b, and 28b, and terminals 19a and 19b as conductor patterns are made of a conductive material film such as a copper film, and have a thickness H of 50 μm. The coil patterns 16a and 16b have a constant pitch P of 40 μm from the inner to outer peripheries, and a width W of 25 μm. The insulating members 18a and 18b are made of a nonconductive material film, e.g., a photosensitive resin or thermosetting resin material film used in forming the coil patterns 16a and 16b. The insulating members 18a and 18b are equal in thickness to conductor patterns such as the coil patterns 16a and 16b. In this fashion, the thicknesses of the conductor pattern and insulating member 18a and those of the conductor pattern and insulating member 18b are set equal on the upper and lower surface sides of the coil 13, respectively. This prevents conductor patterns such as the coil patterns 16a and 16b from protruding from the upper and lower surfaces of the coil 13. The surface of the coil 13 can, therefore, be made flat. In FIGS. 10A and 10B, all black portions are conductor patterns made of a conductive material film, and all surrounding blank portions are the insulating member 18a (upper surface side) or 18b (lower surface side).

The coil patterns 16a and 16b are connected at an inner peripheral portion via a through hole 21a. The terminal 19a is connected to the outer peripheral portion of the coil pattern 16a, whereas the terminal 19b is connected to that of the coil pattern 16b via a through hole 21b. The terminals 19a and 19b can supply a DC current to the coil patterns 16a and 16b.

The base 15 is formed to electrically insulate the coil patterns 16a and 16b, and is made of a thin resin material sheet such as a polyimide sheet. An interval Tb (almost equal to the thickness of the base 15 in Example 9) between the coil patterns 16a and 16b is 20 μm. The protection coats 20a and 20b are thin films or sheets made of a nonconductive material such as a resin material and prevent damage and corrosion of the surfaces of the coil patterns 16a and 16b. The protection coats 20a and 20b have a thickness Tc of 20 μm.

Since the dummy patterns 17a and 17b are formed in the ineffective regions around the coil patterns 16a and 16b, the thickness T of the coil 13 is uniformly 160 μm on almost the entire surface. Compared to a case in which no dummy pattern is formed, the mechanical strength of the coil 13 increases. The coil 13 is rigid enough, and does not deform, e.g., bend when the coil 13 is bonded to the core 12, mounted on the slider 14, and fixed in manufacturing a magnetic head.

Since the upper surface (surface facing the core 12) of the coil 13 is flat, its lower surface (surface facing the magneto-optical disk 4) does not deform, e.g., protrude or incline upon bonding to the core 12.

When the coil 13 is formed from a plurality of coil patterns, like Example 9, the interval Tb between these coil patterns must be 70 μm or less, and desirably 35 μm or less. This can increase the coil pattern space factor (ratio of the conductor pattern to the remaining portion on the section) to efficiently generate a magnetic field. The coil pattern and the conductor pattern (dummy pattern) formed in the ineffective region are desirably formed such that the thickness T of the coil 13 is set to 70 μm or more.

If coil patterns are formed on both the upper and lower surface sides of the coil, and conductor patterns (dummy patterns) are formed in the ineffective regions on the two sides, like Example 9, expansion/contraction caused by temperature changes occurs to almost the same degree on the upper and lower surface sides of the coil, and the coil does not deform, e.g., warp.

The conductor patterns, i.e., dummy patterns 17a and 17b and guide patterns 26a 27a, 28a, 26b, 27b, and 28b formed in the ineffective region in Example 9 will be described in detail.

In Example 9, the pitch P of the coil patterns 16a and 16b is 40 μm. A region where the distance S from the outer edge of each of the coil patterns 16a and 16b satisfies 0 μm≦S≦60 μm is defined as a first region A1 on both the upper and lower surface sides of the coil 13 in accordance with inequalities 1, 2, and 3; a region where the distance S satisfies 60 μm<S≦240 μm, as a second region A2; and a region where the distance S satisfies 240 μm<S, as a third region A3. In FIGS. 10A and 10B, a broken line B1 represents the boundary between the first and second regions A1 and A2, and a broken line B2 represents the boundary between the second and third regions A2 and A3.

The dummy patterns are formed in the respective regions on the upper and lower surface sides as follows. No dummy pattern is formed in the first region A1 on both the upper and lower surface sides of the coil 13. Hence, the conductor occupation ratio R of the conductor pattern is 0 in the first region A1 on both the upper and lower surface sides. The dummy patterns 17a and 17b are formed from striped conductor patterns in the second and third regions A2 and A3 on both the upper and lower surface sides of the coil 13. The striped conductor patterns have a width of 40 μm and a pitch of 80 μm. In the third region, the dummy patterns 17a and 17b are further formed from 70-μm wide band-like conductor patterns formed along the outer edge of the coil 13. The band-like conductor pattern along the outer edge and the striped conductor pattern are coupled to each other. The guide patterns 26a and 27a are formed at the peripheral edges of the positioning portions 23 and 24 in the third region A3 on the upper surface side of the coil 13, and the guide pattern 28a is formed at the peripheral edge of the positioning portion 25 in the second and third regions A2 and A3. The guide patterns 26b and 27b are formed at the peripheral edges of the positioning portions 23 and 24 in the third region A3 on the lower surface side of the coil 13, and the guide pattern 28b is formed at the peripheral edge of the positioning portion 25 in the second and third regions A2 and A3. These guide patterns 26a, 27a, 28a, 26b, 27b, and 28b have a 70-μm wide band shape. The terminals 19a and 19b are formed in the third region A3 on the upper surface side of the coil 13.

The conductor occupation ratio R of the conductor pattern is about 0.50 in the second region A2 on both the upper and lower surface sides of the coil 13, about 0.55 in the third region A3 on the upper surface side of the coil 13, and about 0.52 in the third region A3 on the lower surface side.

As described above, also in Example 9, the ineffective region is divided into a plurality of regions on the basis of the distance S from the outer edge of the coil pattern (outer edge of the effective region). Conductor patterns are laid out in the respective regions so as to simultaneously satisfy inequalities 1, 2, and 3. In the first region A1, no conductor pattern forms any closed loop. Accordingly, the reinforcing effect can be obtained without degrading the electrical characteristics of the coil.

If the guide patterns 26*a*, 27*a*, 28*a*, 26*b*, 27*b*, and 28*b* are not formed, and the peripheries of the positioning portions 23, 24, and 25 are made from only the base 15 and insulating members 18*a* and 18*b*, the peripheries of the positioning portions 23, 24, and 25 are weak, cannot resist an operating force, and readily deform in fitting the positioning portions 23, 24, and 25 on the locking members 29, 30, and 31 of the slider 14 and attaching the coil 13 to the slider 14 during the manufacture of a magnetic head.

In Example 9, however, the guide patterns 26*a*, 27*a*, 28*a*, 26*b*, 27*b*, and 28*b* made of a conductive material film are formed at the peripheral edges of the positioning portions 23, 24, and 25. Thus, sufficient strength can be ensured to prevent deformation.

A method of manufacturing the coil 13 according to Example 9 will be explained. Formation of the coil 13 can adopt a pattern formation method using photolithography. In this case, an exposure mask can be formed at high positional precision for both guide and coil patterns. Using this mask makes constant the relative position of the guide pattern to the coil pattern, and substantially prevents any errors and manufacturing variations.

The coil 13 having the guide patterns 26*a*, 27*a*, 28*a*, 26*b*, 27*b*, and 28*b* is irradiated from one direction with a carbon dioxide gas laser or excimer laser beam to perform laser processing. Then, the base 15 and insulating members 18*a* and 18*b* are removed from inner portions surrounded by the guide patterns 26*a*, 27*a*, 28*a*, 26*b*, 27*b*, and 28*b*, thereby forming holes and a recess, which serve as the positioning portions 23, 24, and 25. This processing method selectively removes only a resin material as the constituent material of the base 15 and insulating members 18*a* and 18*b*. The guide patterns 26*a*, 27*a*, 28*a*, 26*b*, 27*b*, and 28*b* made of a conductive material film such as a copper film are not influenced by this processing, and serve as laser beam-shielding masks. By emitting a beam to ranges slightly larger than the positioning portions 23, 24, and 25, the base can be removed from only inner portions surrounded by the guide patterns 26*a*, 27*a*, 28*a*, 26*b*, 27*b*, and 28*b*.

According to the manufacturing method, the formation positions and sizes of the positioning portions 23, 24, and 25 are determined by the guide patterns 26*a*, 27*a*, 28*a*, 26*b*, 27*b*, and 28*b* formed in advance. Even if the attaching position of the coil 13 to a processing apparatus is erroneous, the positioning portions 23, 24 and 25 are free from the influence of any error and can be formed at very high positional and dimensional precisions.

The relative positional precision of the guide patterns 26*a*, 27*a*, 28*a*, 26*b*, 27*b*, and 28*b* formed around the positioning portions 23, 24, and 25 to the coil patterns 16*a* and 16*b* is very high. By fitting the locking members 29, 30, and 31 in the positioning portions 23, 24, and 25, the coil 13 is attached to the slider 14 at high positional precision. The magnetic field generation center (coil pattern center) is constant with respect to the slider 14, and does not vary. Hence, a magnetic field generated by the magnetic head 1 can be accurately applied to the irradiation position of a recording beam on the magneto-optical disk 4.

Note that the formation positions and shapes of holes and a recess serving as the positioning portions, and those of guide patterns formed at their peripheral edges are not limited to Example 9 shown in FIGS. 10A and 10B. The locking member to be fit in the positioning portion formed on the coil may be formed on not the slider but another magnetic head building member such as the core.

Comparative examples for Examples 1 to 9 will be described.

COMPARATIVE EXAMPLE 1

Figure 19A:
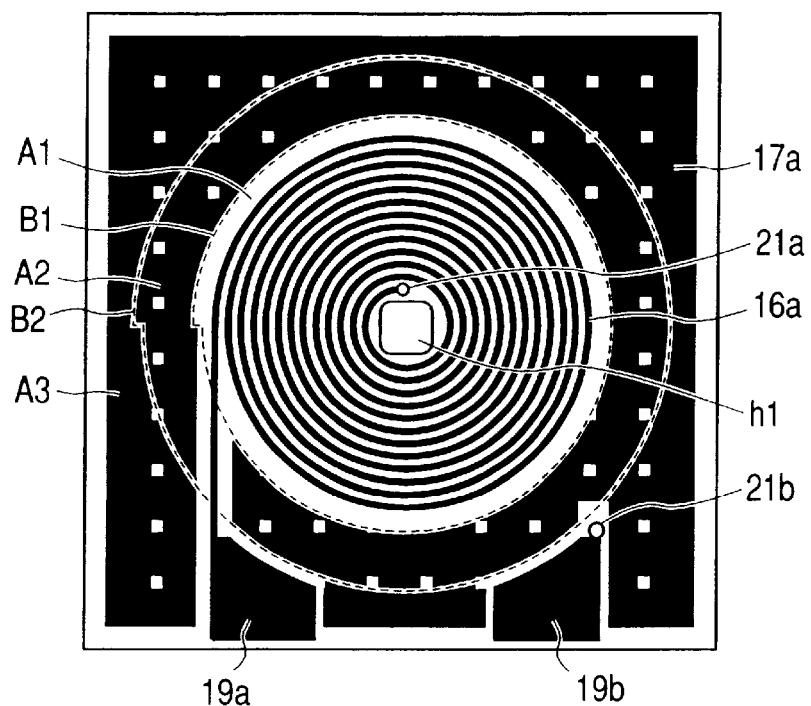
FIGS. 19A and 19B are plan views showing the structure of a coil according to Comparative Example 1.
Figure 19B:
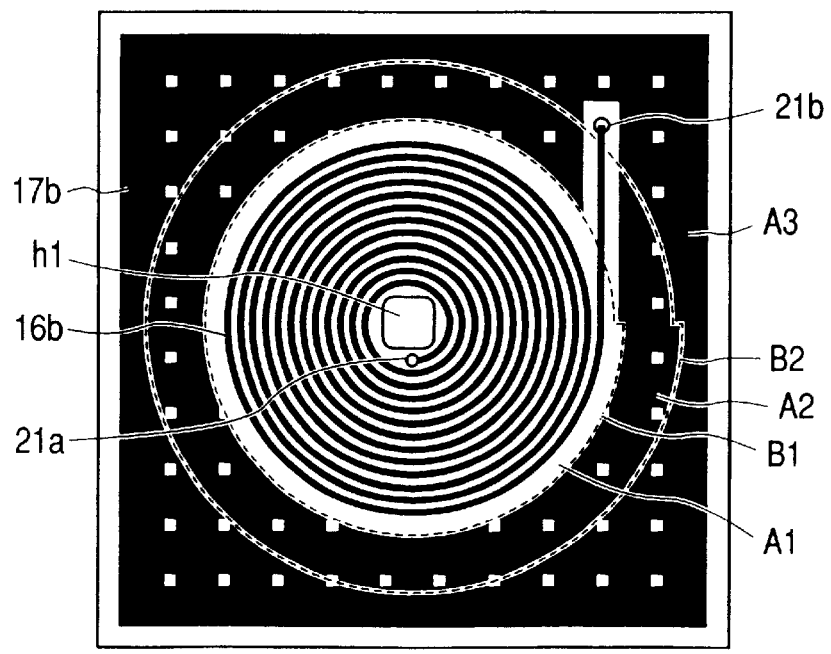

FIGS. 19A and 19B show the detailed structure of a coil 13 as Comparative Example 1. FIG. 19A is a plan view when viewed from the top, and FIG. 19B is a plan view when viewed from the bottom. The structure except for conductor patterns formed in the ineffective region is the same as that in Example 1 shown in FIGS. 1, 2A, and 2B, and a description thereof will be omitted.

The conductor patterns, i.e., dummy patterns 17*a* and 17*b* formed in the ineffective region in Comparative Example 1 will be described. Also in this example, a region where the distance S from the outer edge of each of coil patterns 16*a* and 16*b* satisfies $0 \mu m \leq S \leq 60 \mu m$ is defined as a first region A1 on both the upper and lower surface sides of the coil 13 in accordance with inequalities 1, 2, and 3; a region where the distance S satisfies $60 \mu m < S \leq 240 \mu m$, as a second region A2; and a region where the distance S satisfies $240 \mu m < S$, as a third region A3. In FIGS. 19A and 19B, a broken line B1 represents the boundary between the first and second regions A1 and A2, and a broken line B2 represents the boundary between the second and third regions A2 and A3.

The dummy patterns 17*a* and 17*b* are formed from square-matrix-like conductor patterns in the entire region A1 except for a region where the distance S from the outer edge of each of the coil patterns 16*a* and 16*b* satisfies $S < 20 \mu m$. The square-matrix-like conductor patterns have a width of $120 \mu m$ and a pitch of $165 \mu m$. Terminals 19*a* and 19*b* are formed in the third region A3 on the upper surface side of the coil 13.

On both the upper and lower surface sides, the conductor occupation ratio R of the conductor pattern is about 0.58 in the first region A1, and about 0.93 in the second region A2. The conductor occupation ratio R of the conductor pattern is about 0.94 in the third region A3 on the upper surface side, and about 0.93 in the third region A3 on the lower surface side.

In Comparative Example 1, the conductor occupation ratios R in the first region A1 and second region are higher than the ranges defined by inequalities 1 and 2.

COMPARATIVE EXAMPLE 2

Figure 20A:
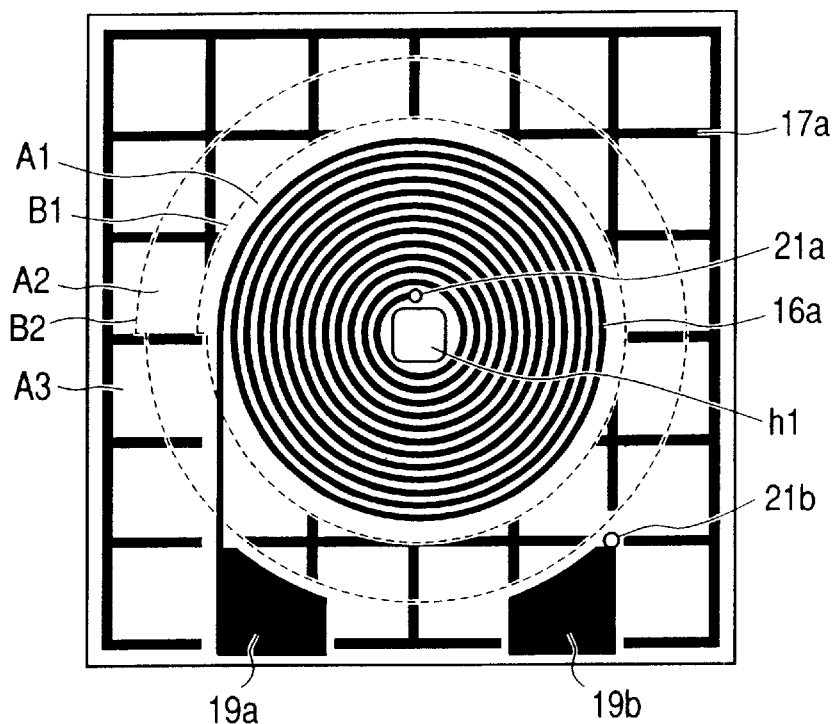
FIGS. 20A and 20B are plan views showing the structure of a coil according to Comparative Example 2.
Figure 20B:
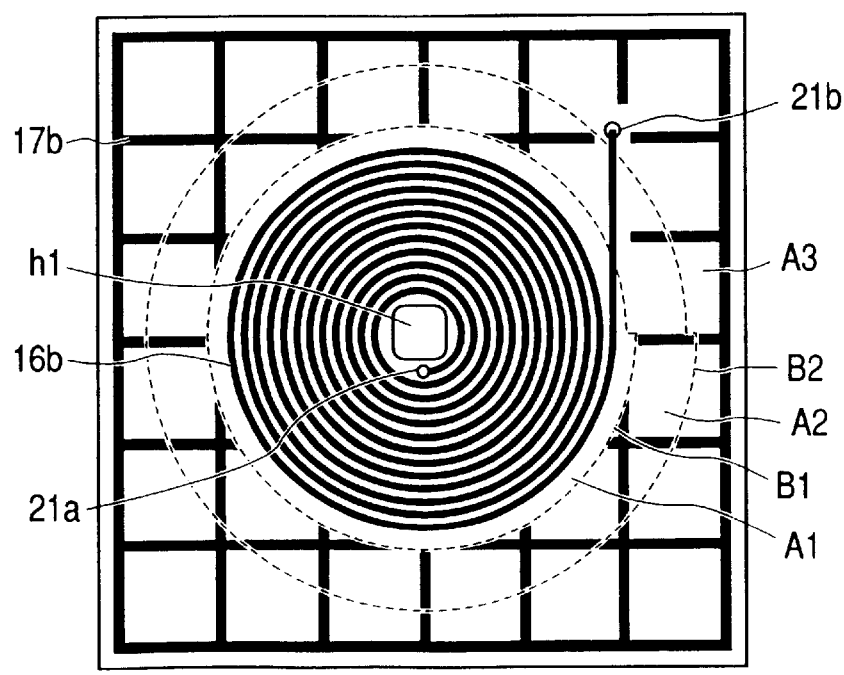

FIGS. 20A and 20B show the detailed structure of a coil 13 as Comparative Example 2. FIG. 20A is a plan view when viewed from the top, and FIG. 20B is a plan view when viewed from the bottom. The structure except for conductor patterns formed in the ineffective region is the same as that in Example 1 shown in FIGS. 1, 2A, and 2B, and a description thereof will be omitted.

The conductor patterns, i.e., dummy patterns 17*a* and 17*b* formed in the ineffective region in Comparative Example 2 will be described. Also in this example, a region where the distance S from the outer edge of each of coil patterns 16a and 16b satisfies 0 μm≦S≦60 μm is defined as a first region A1 on both the upper and lower surface sides of the coil 13 in accordance with inequalities 1, 2, and 3; a region where the distance S satisfies 60 μm<S≦240 μm, as a second region A2; and a region where the distance S satisfies 240 μm<S, as a third region A3. In FIGS. 20A and 20B, a broken line B1 represents the boundary between the first and second regions A1 and A2, and a broken line B2 represents the boundary between the second and third regions A2 and A3.

The dummy patterns 17a and 17b are formed from square-matrix-like conductor patterns in the entire region A1 except for a region where the distance S from the outer edge of each of the coil patterns 16a and 16b satisfies S<20 μm. The square-matrix-like conductor patterns have a width of 30 μm and a pitch of 300 μm. Terminals 19a and 19b are formed in the third region A3 on the upper surface side of the coil 13.

On both the upper and lower surface sides, the conductor occupation ratio R of the conductor pattern is about 0.09 in the first region A1, and about 0.19 in the second region A2. The conductor occupation ratio R of the conductor pattern is about 0.22 in the third region A3 on the upper surface side, and about 0.19 in the third region A3 on the lower surface side.

In Comparative Example 2, the conductor occupation ratio R in the third region A3 is lower than the range defined by inequality 3.

Table 1 shows a list of the conductor occupation ratios R in the respective regions of actually manufactured coils 13 according to Examples 1 to 9 and Comparative Examples 1 and 2, the measurement values of electrical characteristics, flatness evaluation results, and a maximum modulation frequency fmax achievable in a magneto-optical recording apparatus using the coils 13.

The electrical characteristics of the coil 13 were evaluated by an RF resistance Rp and self-resonance frequency fr measured between the terminals 19a and 19b. The RF resistance Rp is a resistance component parallel to an inductance component L at a frequency of 20 MHz, and the self-resonance frequency fr is a frequency which maximizes an impedance magnitude |Z|.

Based on these results, the present invention (Examples 1 to 9) is compared with Comparative Example 1 to find that the flatness is fine in both the present invention and Comparative Example 1. However, the RF resistance Rp is higher in the present invention than in Comparative Example 1. This means that the RF loss caused by the influence of an eddy current induced within a conductor pattern formed in the ineffective region is smaller in the present invention. Also, the self-resonance frequency fr is higher in the present invention than in Comparative Example 1. This means that the electrostatic capacitance between the coil pattern and the conductor pattern formed in the ineffective region is smaller in the present invention. As a result, the maximum modulation frequency fmax of the magnetic field achievable in the magneto-optical recording apparatus adopting the present invention is about 12 to 14 MHz. In Comparative Example 1, the achievable maximum modulation frequency fmax is about 7 MHz. To set the maximum modulation frequency fmax of the magnetic field to 8 MHz or more, at least the RF resistance Rp and self-resonance frequency fr must be 800 Ω or more and 290 MHz or more, respectively.

The present invention is compared with Comparative Example 2 to find that the electrical characteristics are the same. However, in the present invention, the flatness is fine without any deformation in the manufacture. In Comparative Example 2, the reinforcing effect of a conductor pattern formed in the ineffective region is insufficient, the coil readily deforms during manufacture, and the number of defective devices increases. Even if non-defective devices

TABLE 1

Characteristics in Examples and Comparative Examples

| | | Conductor Occupation Ratio R | | | Electrical Characteristics | | | Maximum Modulation |
|---|---|---|---|---|---|---|---|---|
| | | Region A1 | Region A2 | Region A3 | Rp (Ω) | fr [MHz] | Flatness | Frequency fmax [MHz] |
| Example 1 | Upper Surface | 0 | 0.60 | 0.63 | 1320 | 377 | good | 14 |
| | Lower Surface | 0 | 0.60 | 0.60 | | | | |
| Example 2 | Upper Surface | 0 | 0.56 | 0.59 | 1300 | 392 | good | 14 |
| | Lower Surface | 0 | 0.56 | 0.56 | | | | |
| Example 3 | Upper Surface | 0 | 0.64 | 0.67 | 1320 | 374 | good | 14 |
| | Lower Surface | 0 | 0.64 | 0.64 | | | | |
| Example 4 | Upper Surface | 0 | 0.77 | 0.77 | 1290 | 372 | good | 14 |
| | Lower Surface | 0 | 0.77 | 0.77 | | | | |
| Exatnple 5 | Upper Surface | 0 | 0.50 | 0.55 | 1300 | 395 | good | 14 |
| | Lower Surface | 0 | 0.50 | 0.52 | | | | |
| Example 6 | Upper Surface | 0 | 0 | 0.55 | 1310 | 401 | good | 14 |
| | Lower Surface | 0 | 0 | 0.52 | | | | |
| Example 7 | Upper Surface | 0.28 | 0.50 | 0.55 | 1190 | 356 | good | 12 |
| | Lower Surface | 0.28 | 0.50 | 0.52 | | | | |
| Example 8 | Upper Surface | 0.25 | 0.55 | 0.55 | 1160 | 362 | good | 12 |
| | Lower Surfacc | 0.25 | 0.55 | 0.52 | | | | |
| Example 9 | Upper Surface | 0 | 0.50 | 0.55 | 1330 | 393 | good | 14 |
| | Lower Surface | 0 | 0.50 | 0.52 | | | | |
| Comparative Example 1 | Upper Surface | 0.58 | 0.93 | 0.94 | 740 | 272 | good | 7 |
| | Lower Surface | 0.58 | 0.93 | 0.93 | | | | |
| Comparative Example 2 | Upper Surface | 0.09 | 0.19 | 0.22 | 1300 | 388 | poor | 10 |
| | Lower Surface | 0.09 | 0.19 | 0.19 | | | | | are screened, it is difficult to bring the coil close to a magneto-optical recording medium. Although the electrical characteristics are the same as in the present invention, the achievable maximum modulation frequency fmax of the magnetic field is about 10 MHz which is lower than in the present invention.

In the present invention, the conductor occupation ratio R of a conductor pattern formed in the ineffective region of the coil is defined on the basis of the distance from the coil pattern. Accordingly, a coil having fine electrical characteristics and flatness can be obtained, and the maximum modulation frequency of the magnetic field can be increased.

EXAMPLE 10

Figure 13A:
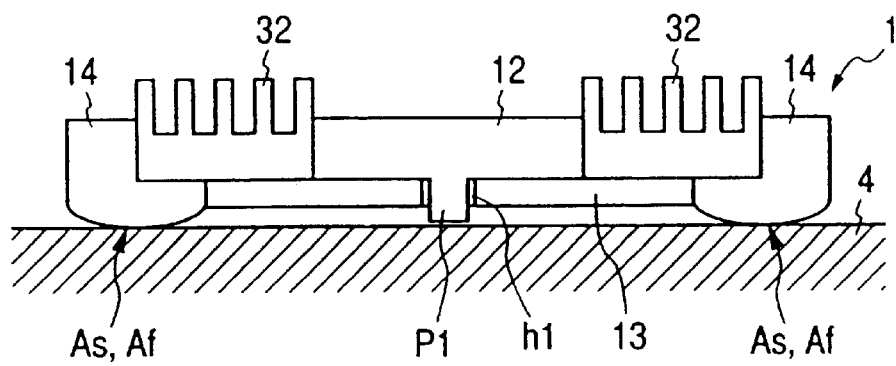
FIGS. 13A and 13B are views, respectively, showing a magnetic head according to Example 10 of the present invention.
Figure 13B:
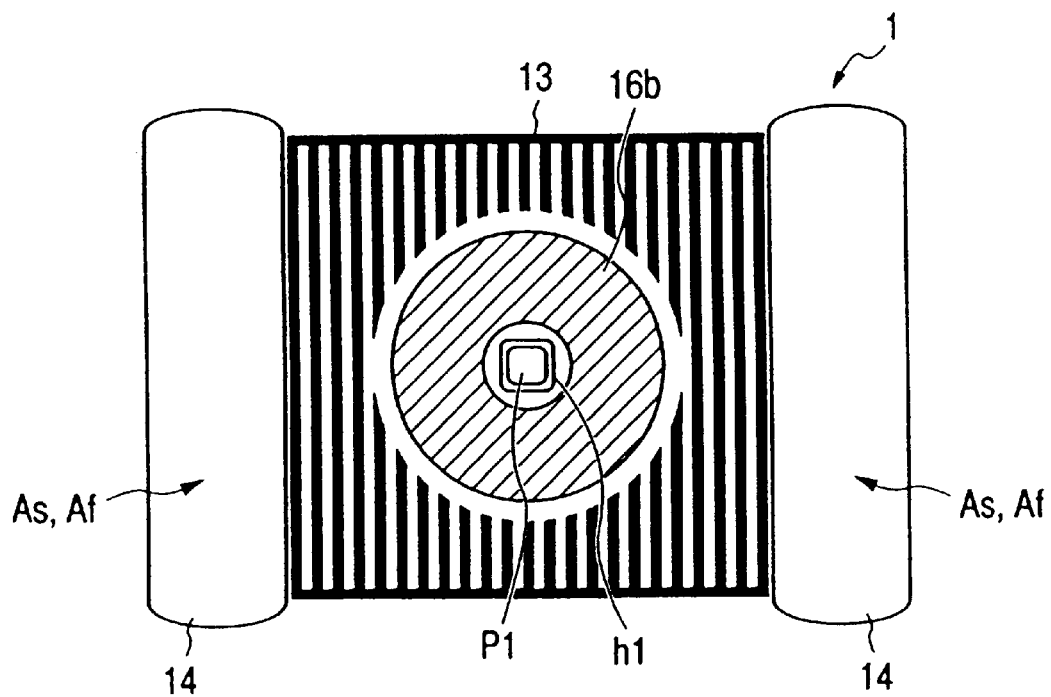

Example 10 of the present invention will be described. FIGS. 13A and 13B show the structure of a magnetic head 1. FIG. 13A is a side sectional view, and FIG. 13B is a bottom view. The magnetic head 1 is constituted by a core 12 made of a magnetic material such as ferrite, a coil 13, a heat dissipation member 32, and a slider 14 which mounts them. Reference numeral 4 denotes a magneto-optical disk serving as a magneto-optical recording medium.

The core 12 is made of a magnetic material such as ferrite with a flat shape, and its center has a projecting magnetic pole p1 with a prism shape. The coil 13 is flat, and its center has a square hole h1. The magnetic pole p1 of the core 12 is inserted in the hole h1. The coil 13 is mounted on the slider 14 together with the core 12. The slider 14 is made of a resin material, ceramic material, or the like, and has a sliding surface As or floating surface Af for sliding or floating/gliding on the magneto-optical disk 4, so as to face the magneto-optical disk 4.

In Example 10, the coil 13 has the same structure as that in Example 1 shown in FIGS. 2A and 2B, and a detailed description thereof will be omitted. The coil 13 may have the same structure as that described in any one of Examples 2 to 9 shown in FIGS. 3A and 3B to FIGS. 10A and 10B.

The heat dissipation member 32 is made of a high-thermal-conductivity metal material such as aluminum, and arranged, directly or via a high-thermal-conductivity adhesive or the like, in tight contact with a dummy pattern 17a formed on the upper surface of the coil 13. If the heat dissipation member 32 is shaped into a corrugated structure, e.g. including a plurality of fins, thereby increasing the surface area, as shown in FIGS. 13A and 13B, the heat dissipation efficiency can be increased.

In recording an information signal, a current is supplied to coil patterns 16a and 16b to generate an RF loss and heat in the core 12 and coil patterns 16a and 16b. Since the dummy pattern 17a and a dummy pattern 17b are made of a high-thermal-conductivity material such as copper, heat generated in the core 12 and coil patterns 16a and 16b conducts to the heat dissipation member 32 via the dummy pattern 17a, and dissipates into the air. Heat also conducts to the dummy pattern 17b, and dissipates into the air from the lower surface of the dummy pattern 17b. Rotation of the magneto-optical disk 4 generates an air flow near its surface. By bringing the dummy pattern 17b close to the magneto-optical disk 4 while facing the disk 4, the heat dissipation efficiency can be increased.

Forming the dummy patterns 17a and 17b can effectively dissipate heat to reduce the temperature rise of the magnetic head 1.

Figure 15:
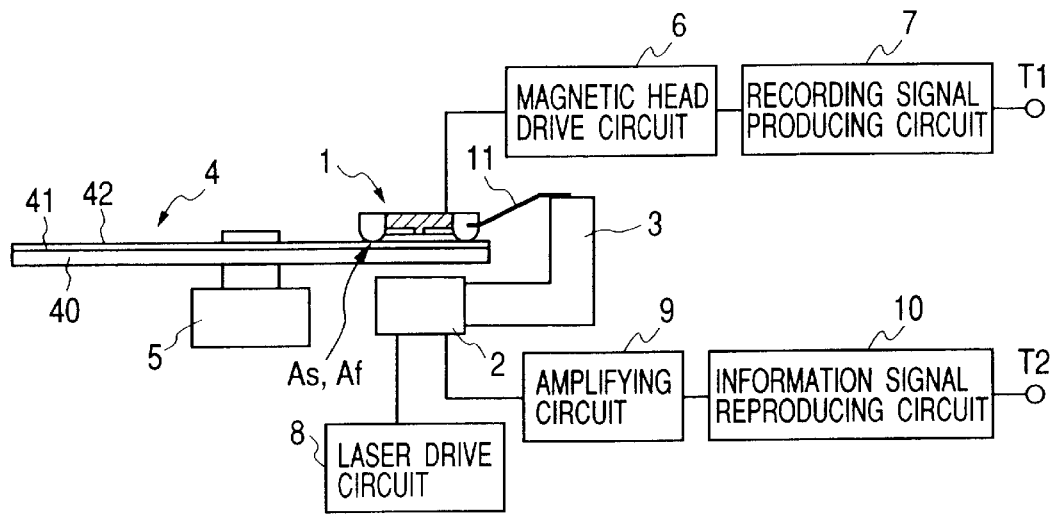
FIG. 15 is a block diagram showing the arrangement of a magneto-optical recording apparatus according to Example 1 of the present invention.

A magneto-optical recording apparatus for recording an information signal on the magneto-optical disk 4 using the above-described magnetic head 1 will be explained. FIG. 15 shows the schematic arrangement of the magneto-optical recording apparatus. The magneto-optical disk 4 is constituted by a substrate 40 made of a transparent resin material, a magnetic recording layer 41 formed on the substrate 40, and a protection film 42. The magneto-optical disk 4 is rotated by a spindle motor 5 at a predetermined speed. On the upper surface side (side having the protection film 42) of the magneto-optical disk 4, the magnetic head 1 shown in FIGS. 11A and 11B, FIGS. 12A and 12B, or FIGS. 13A and 13B is held by one end of an elastic support member 11. The sliding surface As or floating surface Af of the magnetic head is pressed almost parallel against the surface of the magneto-optical disk 4. An optical head 2 which faces the magnetic head 1 and converges recording and reproducing beams to irradiate the magnetic recording layer 41 via the substrate 40 of the magneto-optical disk 4 is arranged on the lower surface side of the magneto-optical disk 4. The support member 11 and optical head 2 are coupled by a coupling member 3.

The coil 13 of the magnetic head 1 is connected to a magnetic head drive circuit 6, which is connected to a recording signal producing circuit 7. The optical head 2 is comprised of a laser source, an optical system such as an objective lens, an optical sensor for detecting reflected light, and the like. The laser source is connected to a laser drive circuit 8; the optical sensor, to an amplifying circuit 9; and the amplifying circuit 9, to an information signal reproducing circuit 10.

Recording operation of an information signal will be described in detail. In recording an information signal, the spindle motor 5 rotates the magneto-optical disk 4. Then, the magnetic head 1 slides on or floats/glides above the protection film 42 of the magneto-optical disk 4.

An information signal to be recorded is input from an input terminal T1 of the recording signal producing circuit 7. The recording signal producing circuit 7 performs modulation such as coding for the information signal to produce a recording signal in synchronism with a clock signal, and outputs the recording signal to the magnetic head drive circuit 6. The magnetic head drive circuit 6 supplies a current modulated by the recording signal to the coil 13 of the magnetic head 1. Accordingly, the magnetic head 1 generates, from the distal end of the magnetic pole p1, a magnetic field which changes between upper and lower directions in accordance with the information signal. The magnetic head 1 vertically applies the magnetic field to the magnetic recording layer 41 of the magneto-optical disk 4.

The laser drive circuit 8 supplies a recording DC current or a pulse current in synchronism with a clock signal to the laser source of the optical head 2. Then, a high-power recording beam which has a constant intensity or flicks like pulses is converged into a light spot, which irradiates the magnetic recording layer 41 via the substrate 40 of the magneto-optical disk 4.

Since the temperature of the magnetic recording layer 41 rises to decrease its coercive force at the recording beam irradiated portion, magnetization is directed to the applied magnetic field. The temperature of the magnetic recording layer 41 drops to increase its coercive force apart from the irradiated portion of the recording beam. Then, magnetization is fixed to form a magnetized region corresponding to the information signal.

Reproducing operation of a recorded information signal will be explained in detail. Also in reproducing a recorded information signal, the spindle motor 5 rotates the magneto-optical disk 4. Since the magnetic head 1 is not generally used for reproduction of an information signal, the magnetic head 1 need not slide on or float/glide above the protection film 42 of the magneto-optical disk 4, and may be retracted to a position above the magneto-optical disk 4 so as to be separated from the disk 4.

The laser drive circuit 8 supplies a reproducing DC current to the laser source of the optical head 2. Then, a low-power reproducing beam is converged into a light spot, which irradiates the magnetic recording layer 41 via the substrate 40 of the magneto-optical disk 4.

The polarization plane of the reflected beam, serving as an information signal, of the reproducing beam from a magnetized region is obtained by the magneto-optical effect (Kerr effect), so that the polarization plane rotates in accordance with the magnetization direction of the magnetized region. The optical system of the optical head 2 converts rotation of the polarization plane of the reflected beam into an intensity change. The optical sensor detects this intensity change, and outputs it as an electrical signal. The detection signal is output from the optical head 2. The detection signal is amplified by the amplifying circuit 9, and undergoes signal processing such as binarization and decoding by the information signal reproducing circuit 10. As a result, the information signal is reproduced and output from a terminal T2.

EXAMPLE 11

Figure 14A:
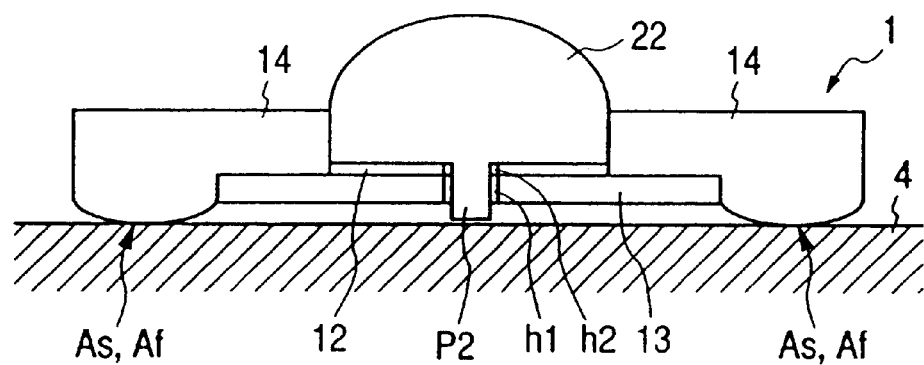
FIGS. 14A and 14B are views, respectively, showing a magnetic head according to Example 11 of the present invention.
Figure 14B:
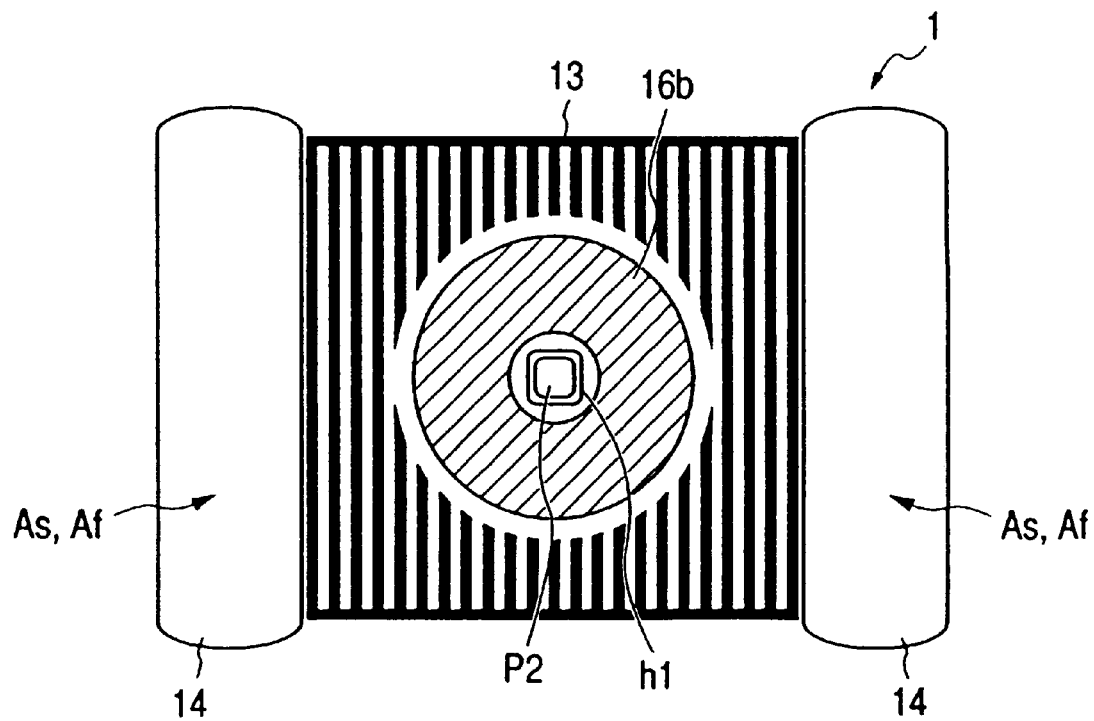

Example 11 of the present invention will be described. FIGS. 14A and 14B are sectional views showing the structure of a magnetic head 1. The magnetic head 1 is constituted by a core 12 made of a magnetic material such as ferrite, a coil 13, a slider 14 which is made of a resin material, ceramic material, or the like, and mounts the core 12 and coil 13, and a hemispherical lens 22 having a projection p2 at the center on the lower surface. Reference numeral 4 denotes a magneto-optical disk serving as a magneto-optical recording medium.

The lens 22 is arranged to converge, into a small light spot, a recording or reproducing beam for irradiating the magneto-optical disk 4 from the optical head in recording or reproducing an information signal on or from the magneto-optical disk 4 using a magneto-optical recording apparatus (to be described later). The core 12 is flat, and its center has a hole h2. The center of the coil 13 has a hole h1. The projection p2 of the lens 22 is inserted in the hole h2 of the core 12 and the hole h1 of the coil 13.

The coil 13 has the same structure as that described in Example 1, and a detailed description thereof will be omitted.

Figure 16:
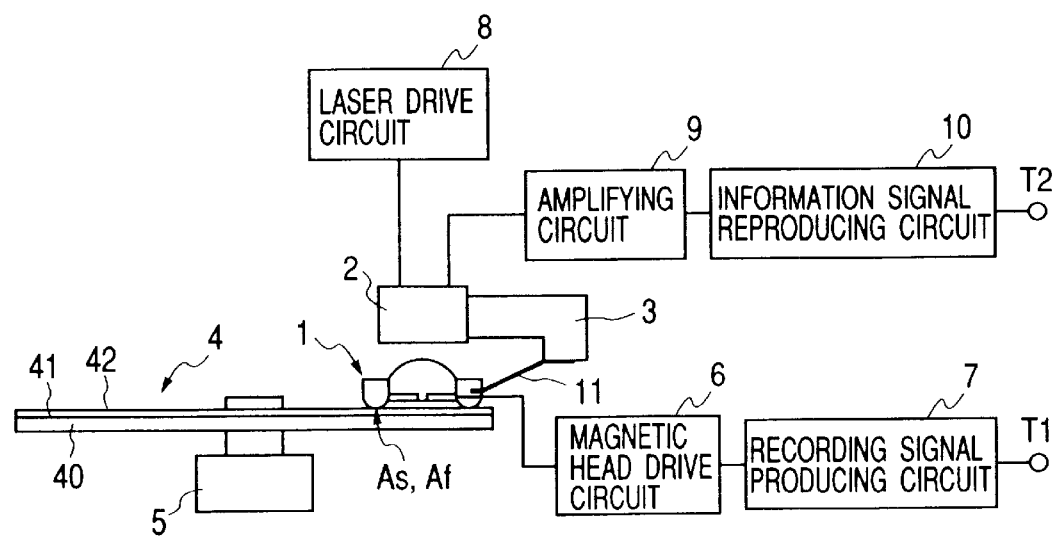
FIG. 16 is a block diagram showing the arrangement of a magneto-optical recording apparatus according to Example 2 of the present invention.
Figure 17:
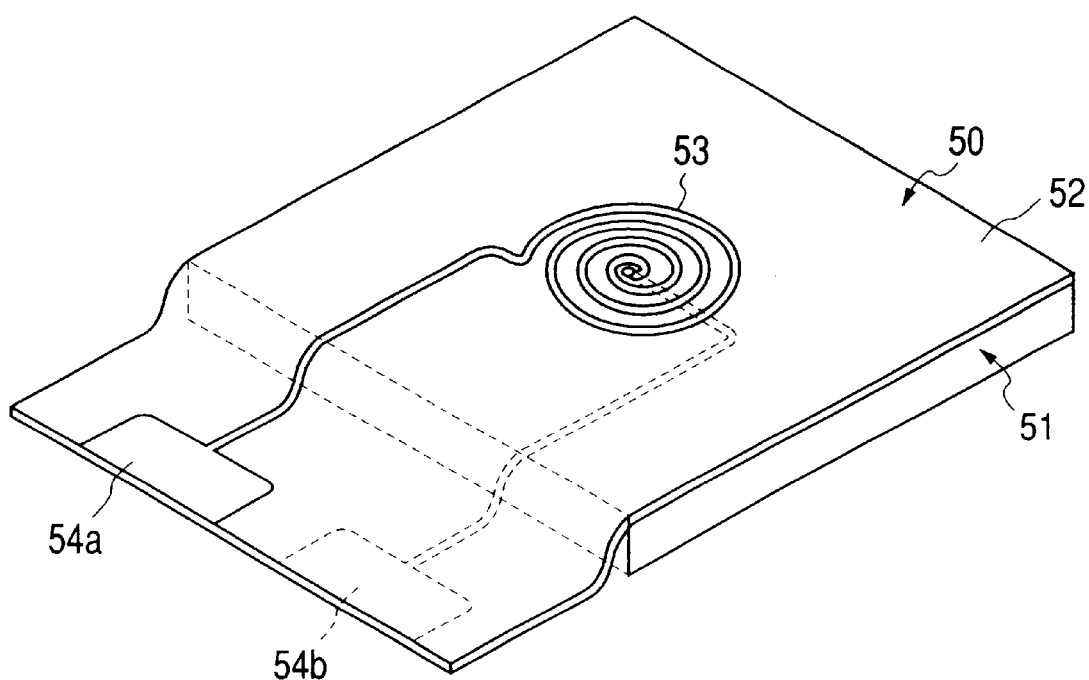
FIG. 17 is a perspective view showing a conventional magnetic head for magneto-optical recording.
Figure 18:
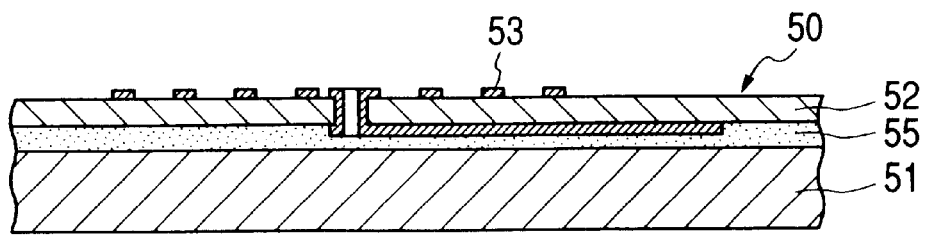
FIG. 18 is a sectional view showing the conventional magnetic head for magneto-optical recording.

A magneto-optical recording apparatus for recording an information signal on the magneto-optical disk 4 using the above-described magnetic head 1 will be explained. FIG. 16 shows the schematic arrangement of the magneto-optical recording apparatus. The magneto-optical disk 4 is constituted by a substrate 40 made of a resin material, a magnetic recording layer 41 formed on the substrate 40, and a protection film 42 made of a transparent material. The magneto-optical disk 4 is rotated by a spindle motor 5 at a predetermined speed. On the upper surface side (side having the protection film 42) of the magneto-optical disk 4, the magnetic head 1 is held by one end of an elastic support member 11. The sliding surface As or floating surface Af of the magnetic head is pressed almost parallel against the surface of the magneto-optical disk 4. An optical head 2 for converging recording and reproducing beams to irradiate the magnetic recording layer 41 via the lens 22 of the magnetic head 1 and the substrate 40 of the magneto-optical disk 4 is arranged above the magnetic head 1. The support member 11 and optical head 2 are coupled by a coupling member 3.

The coil 13 of the magnetic head 1 is connected to a magnetic head drive circuit 6, which is connected to a recording signal producing circuit 7. The optical head 2 is comprised of a laser source, an optical system such as an objective lens, an optical sensor for detecting reflected light, and the like. The laser source is connected to a laser drive circuit 8; the optical sensor, to an amplifying circuit 9; and the amplifying circuit 9, to an information signal reproducing circuit 10.

Recording operation and reproducing operation of an information signal are the same as in Example 1. The spindle motor 5 rotates the magneto-optical disk 4. While the magnetic head 1 slides on or floats/glides above the protection film 42 of the magneto-optical disk 4, an information signal is recorded and reproduced.

In Example 11, the distal end of the projection p2 of the lens 22 attached to the magnetic head 1 is brought very close to the magneto-optical disk 4, and the optical head 2 irradiates the magneto-optical disk 4 with a recording or reproducing beam via the lens 22. The beam can be converged into a smaller light spot, thereby increasing the information signal recording density. When the beam need not be converged into a smaller light spot, the magnetic head 1 need not comprise the lens 22. Alternately, the magnetic head 1 may or may not comprise a member (e.g., glass plate) for transmitting a laser beam.

Even in this case, the optical head 2 is located above the magnetic head 1, and a recording or reproducing beam irradiates the magnetic recording layer 41 via the protection film 42 of the magneto-optical disk 4. To realize this arrangement, a recording or reproducing beam-transmitting portion, e.g., the hole h1 must be formed in the center of the coil 13, and the coil pattern must surround the beam-transmitting portion.

Also in Example 11, dummy patterns 17a and 17b are formed in ineffective regions around coil patterns 16a and 16b. The thickness T of the coil 13 is uniformly 160 $\mu$m on almost the entire surface. Compared to a case in which no dummy pattern is formed, the mechanical strength of the coil 13 increases. The coil 13 is rigid enough, and does not deform, e.g., bend when the coil 13 is bonded to the core 12, mounted on the slider 14, and fixed in manufacturing a magnetic head. Since the upper surface (surface facing the core 12) of the coil 13 is flat, its lower surface (surface facing the magneto-optical disk 4) does not deform, e.g., protrude or incline upon bonding to the core 12.

The dummy patterns 17a and 17b can dissipate heat generated by the coil patterns 16a and 16b and core 12, thereby preventing the temperature rise of the magnetic head. If the magnetic head 1 comprises a heat dissipation member, like Example 10, the heat dissipation efficiency can be increased.

In Example 11, the coil 13 may have the same structure as that described in Examples 2 to 8. As described in Example 9, the coil 13 and slider 14 may comprise a positioning portion and a locking member, respectively.

INDUSTRIAL APPLICABILITY

As has been described above, in a flat coil component for a magnetic head according to the present invention, the ineffective region where a conductor pattern capable of supplying a current so as to flow around the magnetic field generation center is not formed is divided into the first, second, and third regions A1, A2, and A3 on the basis of the distance S from the outer edge of the coil pattern (outer edge of the effective region). Conductor patterns are formed in the respective regions so as to simultaneously satisfy inequalities 1, 2, and 3. In the first region A1, no conductor pattern forms any closed loop. Consequently, the present invention provides a flat coil component for a magnetic head in which the mechanical strength, flatness, and dimensional precision are improved without degrading the electrical characteristics of the coil. Using this coil can prevent any deformation such as bending when the coil is bonded to the core, mounted on the slider, and fixed in manufacturing a magnetic head. If the coil pattern is formed on the upper surface side of the coil to which another member is bonded, and the conductor pattern is formed in the ineffective region outside the coil pattern, the lower surface of the coil facing the magneto-optical recording medium does not deform, e.g., protrude or incline upon bonding.

The present invention, therefore, implements a magnetic head having high relative positional precision between the coil and the optical head and high distance precision between the coil and the magneto-optical recording medium. Even when the coil is downsized to reduce its inductance, the magnetic field can be accurately applied to the recording beam irradiation position of the magneto-optical recording medium. This allows setting the magnetic field modulation frequency to 8 MHz or more and increasing the information signal recording speed.

If the guide pattern is formed at the peripheral edge of the positioning portion in a coil having the positioning portion, the mechanical strength around the positioning portion increases. In fitting the positioning portion on a locking member attached to another building member, the coil does not deform, and the positional precision of the coil can be further increased. By forming guide and coil patterns by photolithography, the positioning portion can be formed at high positional and dimensional precision. Even when the coil is further downsized, the relative positional precision between the coil and the optical head can be increased.

Heat generated in the coil pattern and core formed in the effective region dissipates via the conductor pattern formed in the ineffective region, which prevents the temperature rise of the magnetic head. Especially, a magnetic head having a heat dissipation member in tight contact with the conductor pattern can attain higher dissipation efficiency.

The present invention can, therefore, reduce the temperature rise of the magnetic head caused by the RF loss of the core or coil pattern at a high magnetic field modulation frequency. The present invention can prevent a decrease in the saturation flux density Bs of the magnetic material forming the core, and a decrease in the strength of a magnetic field generated by the magnetic head. In addition, the present invention can prevent deformation of the building member of the magnetic head and any electrical insulation failure.

Thus, the present invention can increase the magnetic field modulation frequency and information signal recording density, compared to the prior art.

What is claimed is:

1. A magnetic head coil having a conductor pattern made of a conductive material film, wherein the conductor pattern includes a spiral coil pattern to which a current can be supplied to flow around a magnetic field generation center, and a conductor pattern which is formed outside the coil pattern and cannot receive at least a current so as to flow around the magnetic field generation center, where S is a distance from an outer edge of an outermost periphery of the coil pattern, and P is a pitch (or minimum value when the pitch is not constant) of the coil pattern, a conductor occupation ratio (ratio of a total area of all conductor patterns formed in a given region to a total area of the region) R of a conductor pattern formed outside the coil pattern simultaneously satisfies inequalities 1, 2, and 3, and the conductor pattern does not form any closed loop surrounding the coil pattern in a first region A1 given by inequality 1:

Inequality 1: $0 \leq R \leq 0.3$ in the first region A1 where $0 \leq S \leq 1.5P$ Inequality 2: $0 \leq R \leq 0.8$ in a second region A2 where $1.5P < S \leq 6.0P$ Inequality 3: $0.3 < R \leq 1$ in a third region A3 where $6.0P < S$.

2. A magnetic head coil according to claim 1, wherein in the first region A1 given by inequality 1, the conductor pattern formed outside the coil pattern is discontinuous conductor patterns divided into at least two in a spiral direction of the coil pattern.

3. A magnetic head coil according to claim 2, wherein all the conductor patterns divided into at least two have an interval of not less than 0.2P.

4. A magnetic head coil according to any one of claims 1, 2, and 3, wherein the conductor pattern formed outside the coil pattern has a periodic shape having a period of not less than P to not more than 5P.

5. A magnetic head coil according to any one of claims 1 to 3, wherein the conductor pattern formed outside the coil pattern includes a conductor pattern formed along a peripheral edge of the flat coil component for a magnet head.

6. A magnetic head coil according to claim 5, wherein the conductor pattern formed along the peripheral edge of the magnetic head coil has a band shape, and is coupled to another conductor pattern.

7. A magnetic head coil according to any one of claims 1 to 3, wherein the magnetic head coil has a positioning portion, and the conductor pattern formed outside the coil pattern includes a guide pattern formed at a peripheral edge of the positioning portion.

8. A magnetic head coil according to any one of claims 1 to 3, wherein the magnetic head coil has a hole for receiving a magnetic pole or a light-transmitting portion, and the coil pattern is formed around the hole or the light-transmitting portion.

9. A magnetic head having a coil facing parallel a magneto-optical recording medium, wherein the coil has a conductor pattern made of a conductive material film, and the conductor pattern includes a spiral coil pattern to which a current can be supplied to flow around a magnetic filed generation center, and a conductor pattern which is formed outside the coil pattern and cannot receive at least a current so as to flow around the magnetic filed generation center, where S is a distance from an outer edge of an outermost periphery of the coil pattern, and P is a pitch (or minimum value when the pitch is not constant) of the coil pattern, a conductor occupation ratio (ratio of a total area of all conductor patterns formed in a given region to a total area of the region) R of a conductor pattern formed outside the coil pattern simultaneously satisfy inequalities 1, 2 and 3, and the conductor pattern does not form any closed loop surrounding the coil pattern in a first region A1 given by inequality 1:

Inequality 1: $0 \leq R \leq 0.3$ in the first region A1 where $0 \leq S \leq 1.5P$ Inequality 2: $0 \leq R \leq 0.8$ in a second region A2 where $1.5P < S \leq 6.0P$ Inequality 3: $0.3 < R \leq 1$ in a third region A3 where $6.0P < S$.

10. A magnetic head according to claim 9, further comprising a core made of a magnetic material.

11. A magnetic head according to claim 9, further comprising a lens.

12. A magnetic head according to claim 9, further comprising a heat dissipation member in tight contact with the conductor pattern formed outside the coil pattern.

13. A magneto-optical recording apparatus having an optical head for irradiating a magneto-optical recording medium with light and a magnetic head for applying a magnetic field modulated by an information signal to the magneto-optical recording medium, wherein the magnetic head has a coil facing parallel the magneto-optical recording medium and a conductor pattern made of a conductive material film, and the conductor pattern includes a spiral coil pattern to which a current can be supplied to flow around a magnetic field generation center, and a conductor pattern which is formed outside the coil pattern and cannot receive at least a current so as to flow around the magnetic field generation center, where S is a distance from an outer edge of an outermost periphery of the coil pattern, and P is a pitch (or minimum value when the pitch is not constant) of the coil pattern, a conductor occupation ratio (ratio of a total area of all conductor patterns formed in a given region to a total area of the region) R of a conductor pattern formed outside the coil pattern simultaneously satisfy inequalities 1, 2 and 3, and the conductor pattern does not form any closed loop surrounding the coil pattern in a first region A1 given by inequality 1:

Inequality 1: $0 \leq R \leq 0.3$ in the first region A1 where $0 \leq S \leq 1.5P$ Inequality 2: $0 \leq R \leq 0.8$ in a second region A2 where $1.5P < S \leq 6.0P$ Inequality 3: $0.3 < R \leq 1$ in a third region A3 where $6.0P < S$.

14. A magnetic head coil according to claim 4, wherein the conductor pattern formed outside the coil pattern includes a conductor pattern formed along a peripheral edge of the flat coil component for a magnet head.

15. A magnetic head coil according to claim 6, wherein the magnetic head coil has a positioning portion, and the conductor pattern formed outside the coil pattern includes a guide pattern formed at a peripheral edge of the positioning portion.

16. A magnetic head coil according to claim 7, wherein the magnetic head coil has a hole for receiving a magnetic pole or a light-transmitting portion, and the coil pattern is formed around the hole or the light-transmitting portion.

17. A magnetic head according to claim 9, wherein the coil has a hole for receiving a magnetic pole or a light-transmitting portion, and the coil pattern is formed around the hole or the light-transmitting portion.

18. A magnetic head according to claim 10, further comprising a lens.

19. A magnetic head according to claim 11, further comprising a heat dissipation member in tight contact with the conductor pattern formed outside the coil pattern.

20. A magneto-optical recording apparatus according to claim 13, said magnetic head having a heat dissipation member in tight contact with the conductor pattern formed outside the coil pattern.

21. A magnetic head according to claim 9, wherein in the first region A1 given by inequality 1 of the coil, the conductor pattern formed outside the coil pattern is discontinuous conductor patterns divided into at least two in a spiral direction of the coil pattern.

22. A magnetic head according to claim 21, wherein in the coil, all the conductor patterns divided into at least two have an interval of not less than 0.2P.

23. A magnetic head according to claim 18, wherein in the first region A1 given by inequality 1 of the coil in the magnetic head, the conductor pattern formed outside the coil pattern is discontinuous conductor patterns divided into at least two in a spiral direction of the coil pattern.

24. A magnetic head according to claim 23, wherein in the coil of the magnetic head, all the conductor patterns divided into at least two have an interval of not less than 0.2P.

* * * * *

UNITED STATES PATENT AND TRADEMARK OFFICE
CERTIFICATE OF CORRECTION

PATENT NO. : 6,584,045 B1
DATED : June 24, 2003
INVENTOR(S) : Kazuyoshi Ishii et al.

It is certified that error appears in the above-identified patent and that said Letters Patent is hereby corrected as shown below:

Column 26,
Line 46, "parallel" should read -- parallel to --.
Lines 50 and 53, "filed" should read -- field --.

Column 27,
Line 15, "parallel" should read -- parallel to --.
Line 28, "satisfy" should read -- satisfies --.

Signed and Sealed this

Twenty-seventh Day of January, 2004

JON W. DUDAS
*Acting Director of the United States Patent and Trademark Office*